United States Patent
Lee et al.

(10) Patent No.: US 7,280,068 B2
(45) Date of Patent: Oct. 9, 2007

(54) SYSTEM AND METHOD FOR MICROWAVE IMAGING WITH SUPPRESSED SIDELOBES USING A SPARSE ANTENNA ARRAY

(75) Inventors: Gregory Steven Lee, Mountain View, CA (US); Robert C. Taber, Palo Alto, CA (US); Izhak Baharav, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 272 days.

(21) Appl. No.: 11/181,111

(22) Filed: Jul. 14, 2005

(65) Prior Publication Data
US 2007/0013575 A1     Jan. 18, 2007

(51) Int. Cl.
*G01S 13/89* (2006.01)

(52) U.S. Cl. .................... 342/22; 342/27; 342/52; 342/54; 342/179

(58) Field of Classification Search ............ 342/22, 342/27, 52, 54, 179, 180
See application file for complete search history.

(56) References Cited

U.S. PATENT DOCUMENTS

| | | |
|---|---|---|
| 4,502,025 A | 2/1985 | Carl, Jr. et al. |
| 4,649,393 A | 3/1987 | Rittenbach |
| 4,885,592 A | 12/1989 | Kofol et al. |
| 5,027,125 A | 6/1991 | Tang |
| 5,170,170 A | 12/1992 | Soumekh |
| 5,365,237 A | 11/1994 | Johnson et al. |
| 5,940,030 A | 8/1999 | Hampel et al. |
| 5,940,045 A | 8/1999 | Belcher et al. |
| 5,982,326 A | 11/1999 | Chow et al. |
| 5,986,590 A | 11/1999 | Smith et al. |

(Continued)

FOREIGN PATENT DOCUMENTS

EP     1 705 501     9/2006

(Continued)

OTHER PUBLICATIONS

"A broad-band, undirectional, two-port microstrip patch antenna", Mayes, P.E.; Thomas, M.D.Antennas and Propagation, IEEE Transactions on vol. 38, Issue 5, May 1990 pp. 760-763.*

(Continued)

*Primary Examiner*—John B Sotomayor

(57) ABSTRACT

A microwave imaging system suppresses sidelobes in a microwave image captured using a sparse antenna array using an illumination system that operates in two different illumination modes. The antenna array including subarrays of antenna elements arranged in a sparse geometry to form complementary subarray patterns. The illumination system operates in a first mode to transmit microwave illumination to both of the complementary subarray patterns of the antenna array and receive reflected microwave illumination from both of the complementary subarray patterns of the antenna array to produce a first receive signal. The illumination system further operates in a second mode to transmit microwave illumination to a first one of the complementary subarray patterns of the antenna array and receive reflected microwave illumination from a second one of the complementary subarray patterns of the antenna array to produce a second receive signal. Sidelobes are suppressed using a linear combination of the first and second receive signals.

28 Claims, 10 Drawing Sheets

U.S. PATENT DOCUMENTS

| | | | |
|---|---|---|---|
| 6,037,908 | A | 3/2000 | Phillips et al. |
| 6,043,786 | A | 3/2000 | Vannatta et al. |
| 6,057,761 | A | 5/2000 | Yukl |
| 6,242,740 | B1 | 6/2001 | Luukanen et al. |
| 6,353,224 | B1 | 3/2002 | Sinclair et al. |
| 6,501,414 | B2 | 12/2002 | Arndt et al. |
| 6,549,166 | B2 | 4/2003 | Bhattacharyya et al. |
| 6,642,889 | B1 | 11/2003 | McGrath |
| 6,965,340 | B1 * | 11/2005 | Baharav et al. ............... 342/22 |
| 6,972,714 | B1 * | 12/2005 | Baharav et al. ............. 342/179 |
| 7,112,775 | B2 * | 9/2006 | Lee et al. ................. 250/208.1 |
| 7,183,963 | B2 * | 2/2007 | Lee et al. ..................... 342/22 |
| 2003/0034916 | A1 | 2/2003 | Kwon et al. |
| 2004/0056790 | A1 | 3/2004 | Lovberg et al. |
| 2004/0080448 | A1 | 4/2004 | Lovberg et al. |
| 2006/0214832 | A1 * | 9/2006 | Lee et al. ..................... 342/22 |
| 2006/0214833 | A1 * | 9/2006 | Baharav et al. ............... 342/22 |
| 2006/0214835 | A1 * | 9/2006 | Lee et al. ..................... 342/22 |
| 2006/0214836 | A1 * | 9/2006 | Baharav et al. ............... 342/22 |
| 2007/0013575 | A1 * | 1/2007 | Lee et al. ..................... 342/52 |

FOREIGN PATENT DOCUMENTS

| | | | |
|---|---|---|---|
| GB | 2 356 096 | | 5/2001 |
| JP | 2006270954 | A * | 10/2006 |
| WO | 00 63720 | | 10/2000 |

OTHER PUBLICATIONS

David M. Sheen et al.; "Three-Dimensional Millimeter-Wave Imaging for Concealed Weapon Detection"; IEEE Transactions On Microwave Theory And Techniques, vol. 49, No. 9, Sep. 2001, pp. 1581-1592.

P.F. Goldsmith, et al.; "Focal Plane Imaging Systems for Millimeter Wavelengths"; IEEE Transactions on Microwave Theory And Techniques, vol. 41, No. 10, Oct. 1993, pp. 1664-1675.

Tatsuo Nozokido, et al.; "Scanning Near-Field Millimeter-Wave Microscopy Using a Metal Slit as a Scanning Probe"; IEEE Transactions On Microwave Theory And Techniques, vol. 49, No. 3, Mar. 2001, pp. 491-499.

GB Search Report Under Section 17 dated Oct. 6, 2006.

* cited by examiner

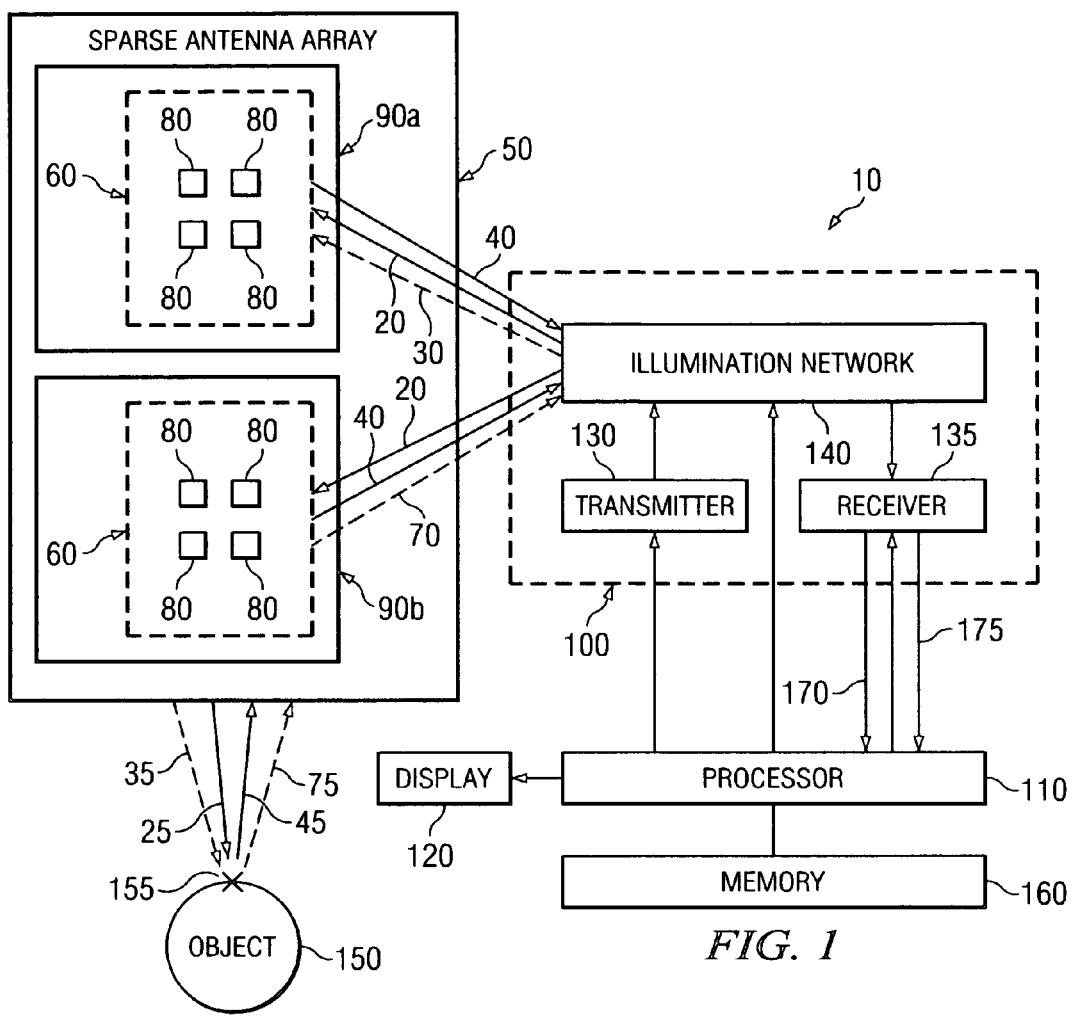
FIG. 1
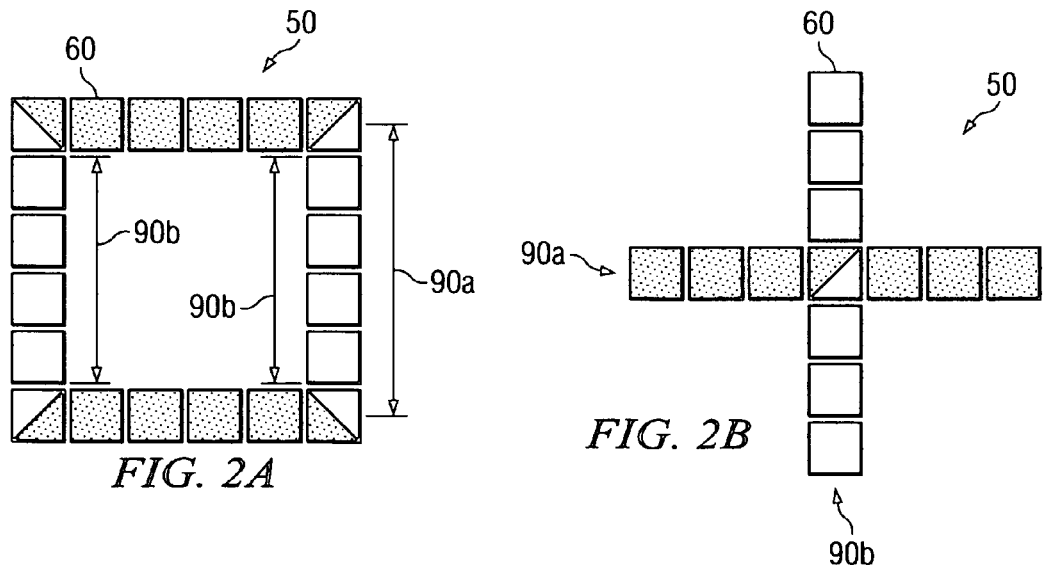
FIG. 2A
FIG. 2B

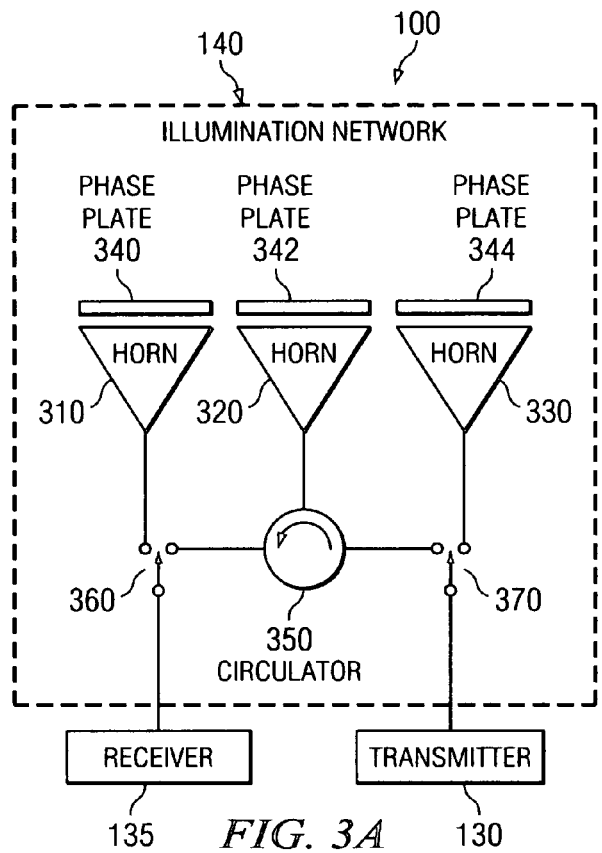
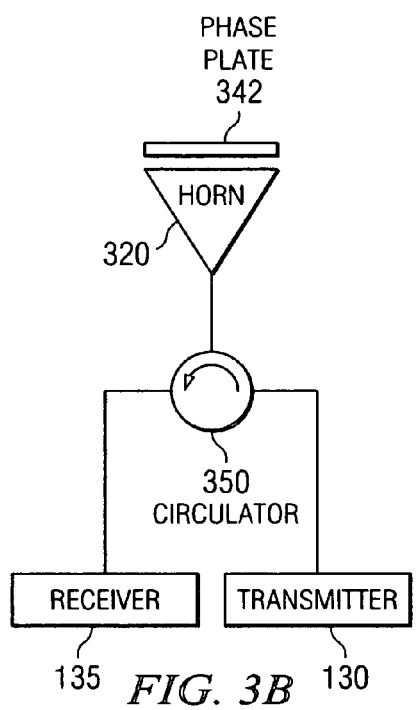
*FIG. 3A*
*FIG. 3B*
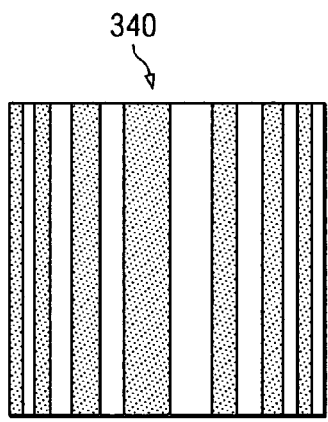
*FIG. 4A*
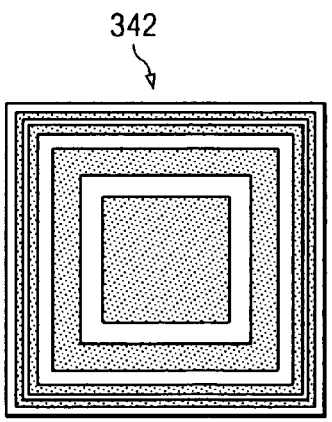
*FIG. 4B*
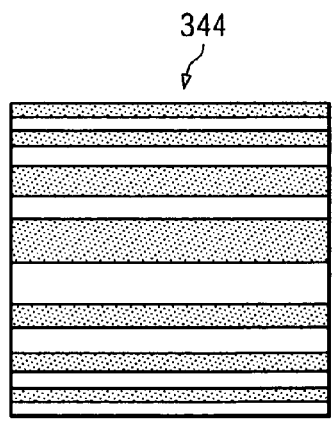
*FIG. 4C*

SYSTEM AND METHOD FOR MICROWAVE IMAGING WITH SUPPRESSED SIDELOBES USING A SPARSE ANTENNA ARRAY

CROSS-REFERENCE TO RELATED APPLICATIONS

This application is related by subject matter to U.S. application for patent Ser. No. 10/997,422, entitled "A Device for Reflecting Electromagnetic Radiation," U.S. application for patent Ser. No. 10/997,583, entitled "Broadband Binary Phased Antenna," and U.S. application for patent Ser. No. 10/996,764, entitled "System and Method for Security Inspection Using Microwave Imaging" all of which were filed on Nov. 24, 2004.

This application is further related by subject matter to U.S. application for patent Ser. No. 11/088,536, entitled "System and Method for Efficient, High-Resolution Microwave Imaging Using Complementary Transmit and Receive Beam Patterns," U.S. application for patent Ser. No. 11/088,831, entitled "System and Method for Inspecting Transportable Items Using Microwave Imaging," U.S. application for patent Ser. No. 11/089,298, entitled "System and Method for Pattern Design in Microwave Programmable Arrays," U.S. application for patent Ser. No. 11/088,610, entitled "System and Method for Microwave Imaging Using an Interleaved Pattern in a Programmable Reflector Array," and U.S. application for patent Ser. No. 11/088,830, entitled "System and Method for Minimizing Background Noise in a Microwave Image Using a Programmable Reflector Array" all of which were filed on Mar. 24, 2005.

BACKGROUND OF THE INVENTION

Recent advances in microwave imaging have enabled commercial development of microwave imaging systems that are capable of generating two-dimensional and even three-dimensional microwave images of objects and other items of interest (e.g., human subjects). At present, there are several microwave imaging techniques available. For example, one technique uses an array of microwave detectors (hereinafter referred to as "antenna elements") to capture either passive microwave energy emitted by the target or reflected microwave energy reflected from the target in response to active microwave illumination of the target. A two-dimensional or three-dimensional image of a person or other item is constructed by scanning the array of antenna elements with respect to the target's position and/or adjusting the frequency (or wavelength) of the microwave energy being transmitted or detected.

Transmit and/or receive antenna arrays for use in transmitting and/or receiving microwave energy can be constructed using traditional analog phased arrays or binary reflector arrays, such as those described in U.S. patent application Ser. No. 10/997,422 entitled "A Device for Reflecting Electromagnetic Radiation," and Ser. No. 10/997,583, entitled "Broadband Binary Phased Antenna." For either type of array, the largest addressable volume with the highest spatial resolution is obtained by choosing a small wavelength $\lambda$, densely filling the array with antenna elements such that the spacing between adjacent antenna elements in both directions is $\lambda/2$, and maximizing the two-dimensional area of the array. For example, if the array is a square of side L, an object located at a distance L from the array can be imaged with a resolution of approximately $\lambda$.

However, the number of antenna elements, and therefore the cost of the array, is proportional to $(L/\lambda)^2$. This quadratic cost dependency is an obstacle to either scaling up the size of an array to increase the addressable field of view or reducing the wavelength to increase the resolution. As used herein, the term "addressable field of view" (AFOV) refers to the volume addressable with high resolution (i.e., the volume that can be resolved within some specified factor of the highest resolution).

One solution that has been suggested for the cost-resolution-AFOV problem is to use a sparse antenna array, instead of a dense antenna array. Since resolution increases with numerical aperture, which depends on the diameter and not the area of the array, an array with two or four antenna elements spaced L apart can achieve the desired resolution. However, sparse arrays produce multi-lobed antenna patterns. If the array is a traditional transmit phased array and $1 \geq s \geq 0$ is the sparseness factor, Parseval's Theorem of Fourier analysis states that only s of the transmit power falls into an area that the originally dense (s=1) array of the same extent resolves. If the sparse array is a reflector array, and a transmit horn illuminates the full extent of the originally dense (s=1) array, the sparse array processes only s of the horn's power. Therefore, the efficiency factor (i.e., the transmitted fraction that fills the original area) is $s^2$. If the reflector array is used to both direct microwave illumination towards the target and receive reflected microwave illumination from the target, the overall efficiency factor $\eta = s^4$. For example, a 50% sparse reflector array produces a transmit-to-receive efficiency of $1/16 = 6.25\%$. Thus, as the sparseness of the array is increased, the signal loss increases as the fourth power.

The signal-to-noise (SNR) ratio of a sparse array also suffers the same $s^2$ or $s^4$ dependency. In addition, the background noise (often referred to as "clutter") that results from stray radiation further decreases the SNR for sparse arrays for several reasons. First, the vacant area of the originally dense (s=1) array becomes a collective plane mirror that specularly bounces the radiation with a fill factor efficiency of 1−s. Second, the remaining (occupancy) area geometry generally produces sidelobes that change direction in a poorly controlled fashion as the antenna phasing changes. The sidelobe weight increases as the sparseness of the array increases. To the degree that these two factors increase system noise as the array becomes sparser, SNR will vary empirically as $s^a/(1-s)^b$, where $a \approx 4$ and $b \approx 1$. Thus, sparse arrays result in an increase in signal loss and a decrease in SNR.

Therefore, what is needed is a microwave imaging system for use with sparse antennat arrays that is capable of capturing a microwave image with suppressed sidelobes.

SUMMARY OF THE INVENTION

Embodiments of the present invention provide an illumination system within a microwave imaging system for illuminating a sparse antenna array to capture a microwave image of a target with suppressed sidelobes. The sparse antenna array includes antenna elements for directing microwave illumination to and from the target, in which the antenna elements are arranged in subarrays in a sparse geometry to form complementary subarray patterns thereof. The illumination system includes transmitter operable to transmit microwave illumination towards the antenna array, a receiver operable to receive from the antenna array reflected microwave illumination reflected from the target and an illumination network operable in two modes to enable sidelobe suppression.

The illumination network is operable in a first mode to transmit microwave illumination from the transmitter to both of the complementary patterns of the antenna array and provide reflected microwave illumination from both of the complementary subarray patterns of the antenna array to the receiver. The illumination network is further operable in a second mode to transmit microwave illumination from the transmitter to a first one of the complementary subarray patterns of the antenna array and provide reflected microwave illumination from a second one of the complementary subarray patterns of the antenna array to the receiver.

Embodiments of the present invention further provide a microwave imaging system including an antenna array, an illumination system and a processor. The antenna array includes a plurality of antenna elements, each capable of being programmed with a respective direction coefficient to direct microwave illumination to and from a target associated with an object. The antenna array further includes subarrays of antenna elements arranged in a sparse geometry to form complementary subarray patterns thereof. The illumination system is operable to provide microwave illumination to illuminate both of the complementary patterns of the antenna array and receive reflected microwave illumination reflected by the target from both of the complementary subarray patterns of the antenna array to produce a first receive signal in a first mode. The illumination system is further operable to provide microwave illumination to illuminate a first one of the complementary subarray patterns of the antenna array and receive reflected microwave illumination from a second one of the complementary subarray patterns of the antenna array to produce a second receive signal in a second mode. The processor is operable to measure a value associated with the target in a microwave image of an object as a linear combination of the first receive signal and the second receive signal.

In one embodiment, the first receive signal and the second receive signal are complex signals describing a main scanning lobe and one or more sidelobes. The processor suppresses sidelobes in the microwave image of the target by adding the product of the first receive signal and a first complex multiplier with the product of the second receive signal and a second complex multiplier to constructively enhance the main scanning lobe and destructively cancel the sidelobes. The first complex multiplier and the second complex multiplier are selected as a function of the sparse geometry of the antenna array.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 1 is a schematic diagram of a simplified exemplary microwave imaging system for capturing a microwave image of an object with suppressed sidelobes using a sparse antenna array, in accordance with embodiments of the present invention;

FIG. 2A is a pictorial representation of an exemplary sparse antenna array design, in accordance with embodiments of the present invention;

FIG. 2B is a pictorial representation of another exemplary sparse antenna array, in accordance with embodiments of the present invention;

FIG. 3A is a schematic diagram of an exemplary illumination system capable of operating in multiple illumination modes for use in the microwave imaging system of the present invention;

FIG. 3B is a schematic diagram of another exemplary illumination system capable of operating in multiple illumination modes for use in the microwave imaging system of the present invention;

FIGS. 4A-4C are pictorial representations of exemplary phase plates for use in the exemplary illumination systems shown in FIGS. 3A and 3B;

DETAILED DESCRIPTION OF THE EXEMPLARY EMBODIMENTS

Figure 5:
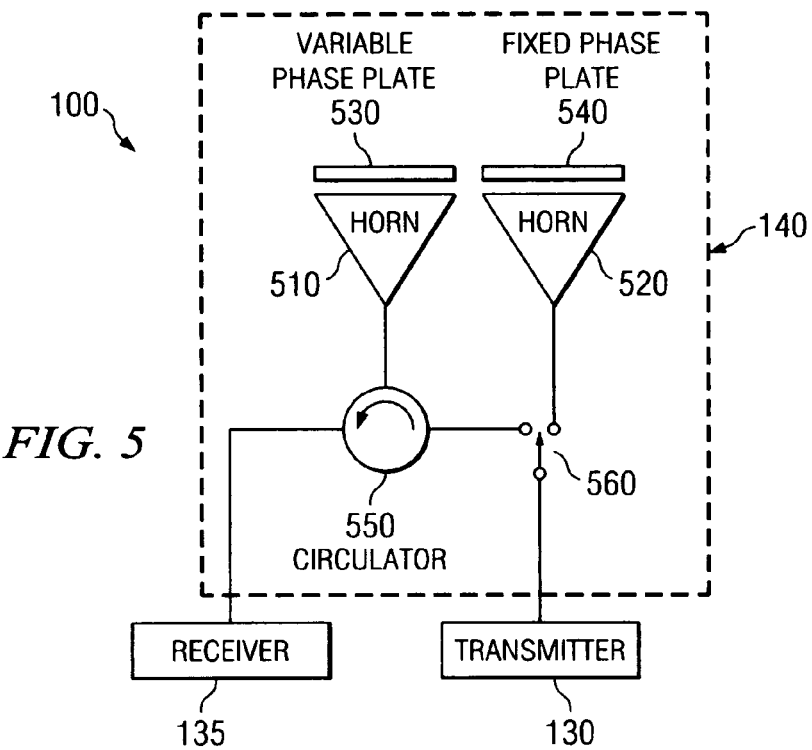
FIG. 5 is a schematic diagram of another exemplary illumination system capable of operating in multiple illumination modes for use in the microwave imaging system of the present invention.

As used herein, the terms microwave radiation and microwave illumination each refer to the band of electromagnetic radiation having wavelengths between 0.3 mm and 30 cm, corresponding to frequencies of about 1 GHz to about 1,000 GHz. Thus, the terms microwave radiation and microwave illumination each include traditional microwave radiation, as well as what is commonly known as millimeter-wave radiation.

FIG. 1 is a schematic diagram of a simplified exemplary microwave imaging system 10, in accordance with embodiments of the present invention. The microwave imaging system 10 includes a one or more sparse antenna arrays 50 (only one of which is shown for convenience), a microwave illumination system 100, a processor 110, a memory 160 and a display 120. The sparse antenna array 50 is capable of transmitting microwave illumination and/or receiving microwave illumination via antenna elements 80 to capture a microwave image of an object 150 (e.g., suitcase, human subject or any other item of interest). Each antenna element 80 is programmed with a particular direction coefficient (e.g., reflection coefficient or transmission coefficient) to direct the microwave illumination to and/or from a target 155 on the object 150. The antenna elements 80 can each be any type of microwave antenna, including, but not limited to, patch, dipole, monopole, loop, and dielectric resonator type antennas.

The sparse antenna array 50 is a passive programmable array composed of either reflecting antenna elements 80 or transmitting antenna elements 80. In a reflection mode, each of the reflecting antenna elements 80 is capable of being programmed with a respective reflection coefficient to reflect microwave illumination towards the target 155 on the object 150 being imaged. The reflection coefficient can represent a binary or continuous phase delay or an amplitude variation. For example, microwave illumination received by the sparse antenna array 50 from the microwave illumination system 100 is reflected towards the target 155 on the object 150, and reflected microwave illumination reflected from the target 155 and received by the sparse antenna array 50 is reflected towards the microwave illumination system 100 by programming each of the individual reflecting antenna elements 80 with a respective reflection coefficient.

In a transmission mode, each of the transmitting antenna elements 80 is capable of being programmed with a respective transmission coefficient to direct microwave illumination towards the target 155 on the object 150 being imaged. For example, microwave illumination received by the sparse antenna array 50 from the microwave illumination system 100 is directed through the array 50 and towards the target 155 on the object 150, and reflected microwave illumination reflected from the target 155 and received by the sparse antenna array 50 is directed through the array 50 and towards the microwave illumination system 100 by programming each of the individual transmitting antenna elements 80 with a respective transmission coefficient.

The antenna elements 80 in the sparse antenna array 50 are shown divided into subarrays 60, each including one or more of the antenna elements 80. The subarrays 60 are further arranged on the array 50 in a sparse geometry to form complementary subarray patterns 90a and 90b thereof. The complementary patterns 90a and 90b generate complementary microwave beam patterns at the target 155, respectively. The microwave image of the target 155 is formed at the intersection of the complementary microwave beam patterns.

The illumination system 100 includes a transmitter 130, a receiver 135 and an illumination network 140 capable of operating in two different illumination modes (hereinafter referred to as joint and disjoint modes) to enable suppression of sidelobes in the microwave image of the object 150. The illumination network 140 includes phase plates or generalized lenses combined with microwave horns to generate the joint and disjoint illuminations of the array 50. Various illumination networks 140 are shown and described in more detail below in connection with FIGS. 5-13.

In the joint mode, the subarrays 60 in both of the complementary subarray patterns 90a and 90b are illuminated by both the transmit feed of the transmitter 130 and the receive feed of the receiver 135. Thus, in the joint mode, microwave illumination 20 is transmitted from the transmitter 130 to both of the complementary subarray patterns 90a and 90b of antenna elements 80 via the illumination network 140 and reflected microwave illumination 40 from both complementary subarray patterns 90a and 90b of antenna elements 80 is received at the receiver 135 via the illumination network 140. In disjoint mode, the subarrays 60 in a first complementary subarray pattern 90a are illuminated by the transmit feed and the subarrays 60 in a second complementary subarray pattern 90b are illuminated by the receive feed. Thus, in the disjoint mode, microwave illumination 30 is transmitted from the transmitter 130 to one of the complementary subarray patterns (e.g., pattern 90a) via the illumination network 140 and reflected microwave illumination 70 from the other complementary subarray pattern (e.g., pattern 90b) is received at the receiver 135 via the illumination network 140.

More specifically, in the joint mode, the illumination network 140 directs microwave illumination 20 from the transmitter 130 towards the antenna elements 80 in both of the subarray patterns 90a and 90b. Based on the direction coefficient programmed into each of the antenna elements 80, microwave illumination 25 is directed from both of the subarray patterns 90a and 90b towards the target 155. The direction coefficients are selected to create positive interference of the microwave illumination 25 from each of the antenna elements 80 at the target 155. For example, in embodiments in which the antenna elements are reflecting antenna elements, the phase shift of each of the antenna elements 80 can be adjusted to provide the same phase delay for each path of the microwave illumination 25 from the source (antenna element 80) to the target 155. The complementary patterns 90a and 90b generate complementary transmit microwave beam patterns at the target 155.

Likewise, reflected microwave illumination 45 reflected from the target 155 and received at the sparse antenna array 50 is directed back towards the illumination network 140 from the antenna elements 80 in both subarray patterns 90a and 90b based on the direction coefficient programmed into each of the antenna elements 80. The complementary patterns 90a and 90b generate complementary receive microwave beam patterns at the illumination network 140. The illumination network 140 receives the reflected microwave illumination 40 and provides the reflected microwave illumination 40 received from both subarray patterns 90a and 90b to the receiver 135. The receiver 135 combines the reflected microwave illumination 40 reflected from each antenna element 80 in both subarray patterns 90a and 90b to produce a first receive signal (joint signal) 170 indicative of the value of the effective intensity of the reflected microwave illumination at the target 155. In one embodiment, the receiver 135 generates the joint signal 170 using the microwave illumination received from the intersection of the complementary receive microwave beam patterns. More specifically, the joint signal 170 produced is the volume-integrated cross product of the complementary receive microwave beams.

In the disjoint mode, the illumination network 140 directs microwave illumination 30 from the transmitter 130 towards the antenna elements 80 in only one of the subarray patterns (e.g., pattern 90a). Based on the direction coefficient programmed into each of the antenna elements 80 in that subarray pattern 90a, microwave illumination 35 is directed from the antenna elements 80 in that subarray patterns 90a towards the target 155. However, reflected microwave illumination 75 reflected from the target 155 and received at the sparse antenna array 50 is directed back towards the illumination network 140 from the antenna elements 80 in the other subarray patterns 90b based on the direction coefficient programmed into each of the antenna elements 80 in that subarray pattern 90b. Thus, the complementary patterns 90a and 90b generate complementary transmit and receive microwave beam patterns at the target 155, respectively.

The illumination network 140 receives the reflected microwave illumination 70 and provides the reflected microwave illumination 70 received from the antenna elements 80 in subarray patterns 90b to the receiver 135. The receiver 135 combines the reflected microwave illumination 70 reflected from each antenna element 80 in the subarray pattern 90b to produce a second receive signal (disjoint signal) 175 indicative of the value of the effective intensity of the reflected microwave illumination at the target 155. In one embodiment, the receiver 135 forms the disjoint signal 175 at the intersection of the complementary transmit and receive microwave beam patterns. More specifically, the joint signal 170 produced is the volume-integrated cross product of the complementary transmit and receive microwave beams.

Both the joint signal 170 and the disjoint signal 175 are passed from the receiver 135 to the processor 110, which uses the signals 170 and 175 to determine the value of a pixel or voxel corresponding to the target 155 on the object 150. The signals 170 and 175 are both complex signals containing real and imaginary parts (or equivalently, amplitude and phase) describing a main scanning lobe and one or more undesired sidelobes. Due to the different transmit/receive paths of the two illumination modes, the sidelobes in each of the signals 170 and 175 are opposite in sign to each other. Thus, the processor 110 is able to constructively enhance the main scanning lobe while destructively canceling the undesired sidelobes by computing an optimal linear combination of the joint signal 170 and the disjoint signal 175.

Figure 14A:
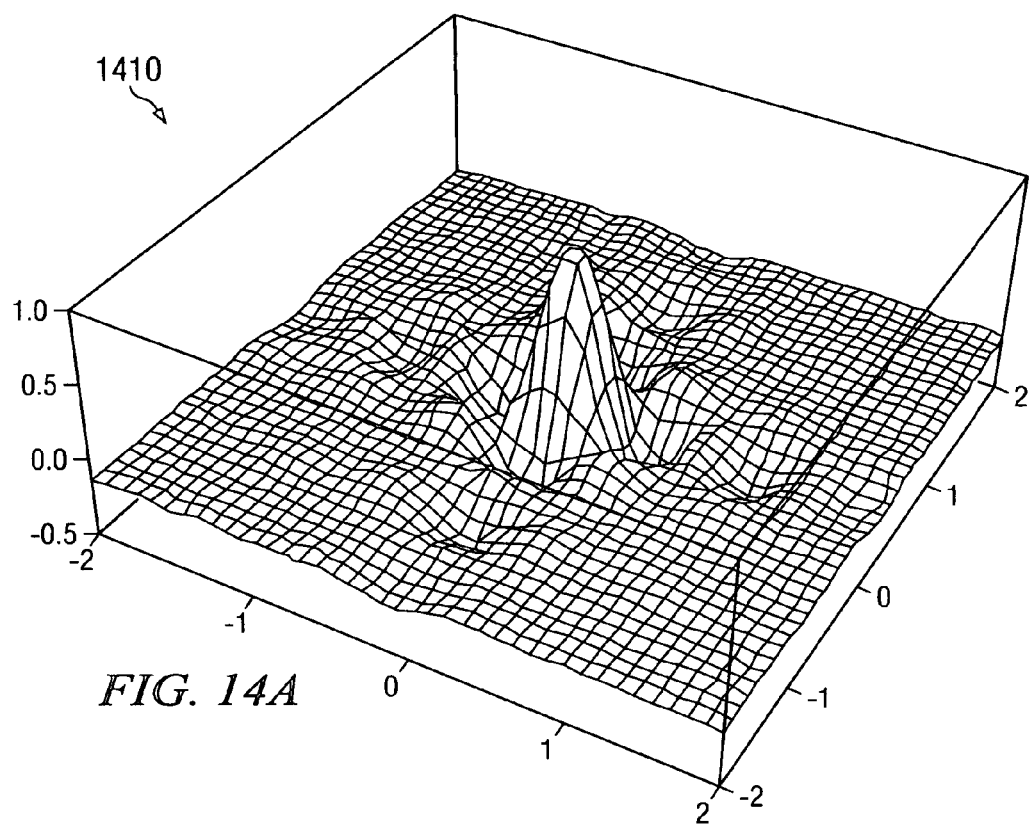
FIG. 14 is a graphical representation of exemplary amplitude product distributions for various illumination modes.
Figure 14B:
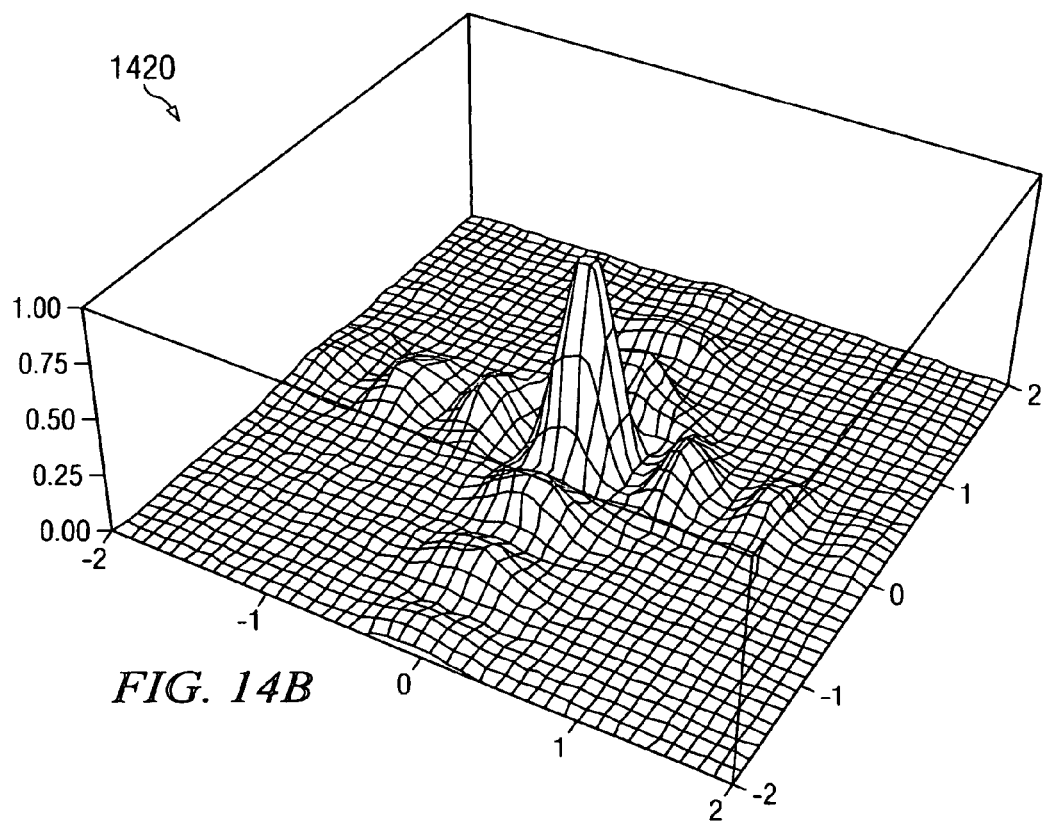
Figure 14C:
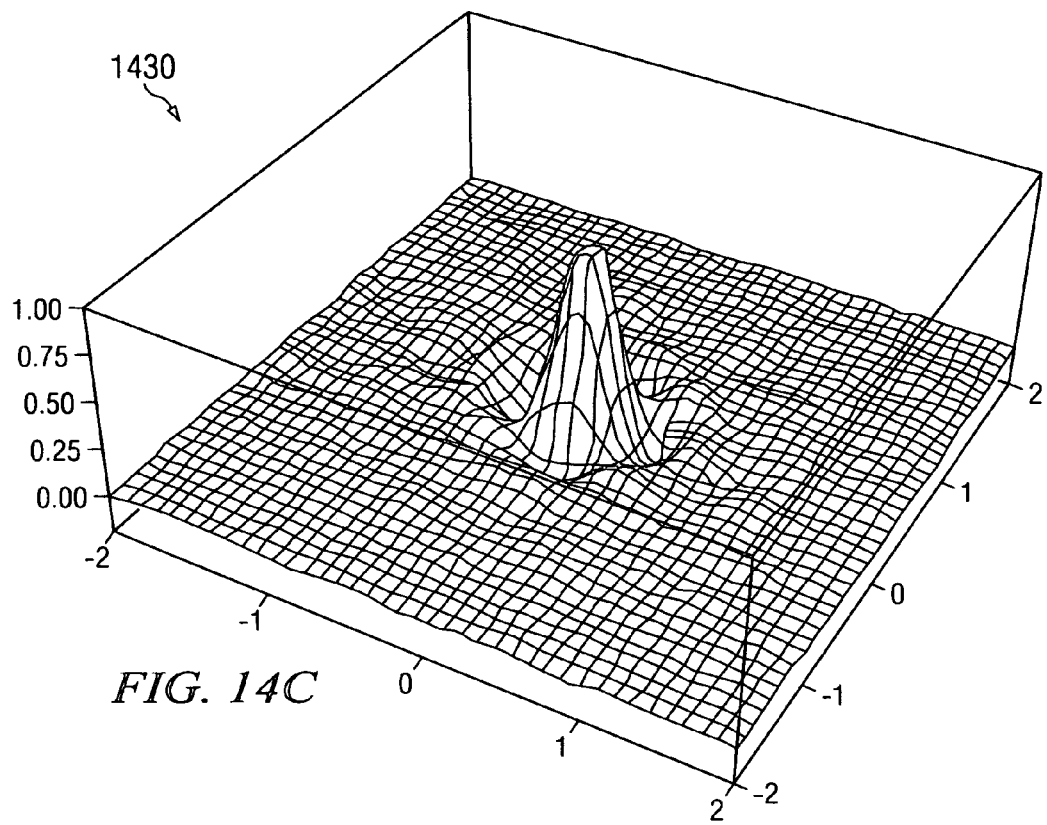

For example, referring now to FIG. 14, an exemplary amplitude product distribution of a disjoint signal is represented in the graph denoted 1410 and an exemplary amplitude product distribution of a joint signal is represented in the graph denoted 1420. The graphs shown in FIG. 14 were constructed using an antenna array having a sparse geometry similar to the geometry shown in FIG. 2A. As can be seen, in both the joint and disjoint modes, in addition to the desired central main lobe, there are four symmetric sets of sidelobes. However, in the disjoint mode (graph 1410), the amplitude of the sidelobes is negative (i.e., opposite in sign to the main lobe), while in the joint mode (graph 1420), the amplitude of the sidelobes is nonnegative (i.e., the same sign as the central lobe). Thus, forming a superposition of the two distributions 1410 and 1420 with the proper weighting between the two distributions 1410 and 1420 results in a distribution with a strong main lobe and weak sidelobes, as shown in graph 1430.

Referring again to FIG. 1, the processor 110 determines the optimal linear combination (weighting) of the joint signal 170 and the disjoint signal 175 based on the sparseness of the array geometry (i.e., complementary subarray patterns 90a and 90b). For example, if the joint signal is denoted J and the disjoint signal is denoted D, the processor 110 selects complex multipliers (weight fractions) $m_J$ and $m_D$ based on the geometry of the array 50, such that $m_J+m_D$=unity, and computes the resultant signal as $m_J*J+m_D*D$.

In general, the weight percentages assigned to the complex multipliers $m_J$ and $m_D$ are linearly proportional to the sparseness of the array 50. For example, for a completely dense array, the weight given to the joint signal is 100%, and thus the value of the complex multiplier $m_J$ is unity and the value of the complex multiplier $m_D$ is zero. Likewise, for a completely sparse array (e.g., a picture frame geometry as shown in FIG. 2A with only a single antenna element per subarray), the weight given to the disjoint signal is 100%, and thus the value of the complex multiplier $m_J$ is zero and the value of the complex multiplier $m_D$ is unity. The values of the complex multipliers $m_J$ and $m_D$ are typically the same for all pixels or voxels in a scan of the object 150, and therefore, the processor 110 can optimize the values of the complex multipliers once and store the optimized values in the memory 160 or within the processor 110 for use during the scan.

In addition, the processor 110 operates to control the illumination system 100 for the joint and disjoint illumination modes. In one embodiment, the processor 110 switches between the joint and disjoint illumination modes. For example, the processor 110 sets the illumination network 140 to the joint mode to receive the joint signal 170, and then sets the illumination network 140 to the disjoint mode to receive the disjoint signal 175. In another embodiment, the processor 110 controls the transmitter 130 and receiver 135 to substantially simultaneously operate in both the joint and disjoint illumination modes.

The processor 110 further operates to program the direction coefficients of each of the individual antenna elements 80 in the sparse antenna array 50 to illuminate multiple targets 155 on the object 150 with microwave radiation and/or receive reflected microwave illumination from multiple targets 155 on the object 150. Thus, the processor 110 in conjunction with the sparse antenna array 50 operates to scan the object 150. In operation, the microwave imaging system 10 operates at frequencies that enable millions of targets 155 to be scanned per second.

The processor 110 includes any hardware, software, firmware, or combination thereof for controlling the sparse antenna array 50 and processing the received microwave illumination reflected from the target 155 to construct a microwave image of the target 155 and/or object 150. In one embodiment, the memory 160 stores software executable by the processor 110 to control the antenna array 50 and/or construct the microwave image of the object 150. In another embodiment, the software is stored in the processor 110, and the memory 160 optionally stores data used by the processor 110 during execution of the software.

For example, the processor 110 may include one or more microprocessors, microcontrollers, programmable logic devices, digital signal processors or other type of processing devices that are configured to execute instructions of a computer program, and one or more memories (e.g., cache memory) that store the instructions and other data used by the processor 110. However, it should be understood that other embodiments of the processor 110 may be used. The memory 160 is any type of data storage device, including but not limited to, a hard drive, random access memory (RAM), read only memory (ROM), compact disc, floppy disc, ZIP® drive, tape drive, database or other type of storage device or storage medium.

The resulting microwave image of the target 155 and/or object 150 can be passed from the processor 110 to the display 120 to display the microwave image. In one embodiment, the display 120 is a two-dimensional display for displaying a three-dimensional microwave image of the object 150 or one or more one-dimensional or two-dimensional microwave images of the target 155 and/or object 150. In another embodiment, the display 120 is a three-dimensional display capable of displaying a three-dimensional microwave image of the object 150.

It should be understood that multiple sparse antenna arrays 50 may be used to scan different portions of the object 150. For example, the microwave imaging system 10 can be implemented with two sparse antenna arrays, each including a 1 m×1 m sparse array of antenna elements 80 to scan half of the object 150. As another example, the microwave imaging system 10 can be implemented with four sparse antenna arrays 50, each including a 0.5 m×0.5 m sparse array of antenna elements 80 capable of scanning a quadrant of the object 150.

Examples of complementary subarray patterns 90a and 90b that form a sparse antenna array 50 are shown in FIGS. 2A and 2B. FIG. 2A illustrates an exemplary "picture frame" pattern, in which one of the complementary subarray patterns 90a includes hatched subarrays 60 and the other complementary subarray pattern 90b includes clear subarrays 60. In the joint illumination mode, all subarrays 60 are illuminated by both the transmit and receive feeds in the microwave illumination system, while in the disjoint illumination mode, the subarrays 60 in the first complementary subarray pattern 90a are illuminated by the transmit feed and the subarrays 60 in the second complementary subarray pattern 90b are illuminated by the receive feed. The corner subarrays 60 are either split-illuminated (by both illumination modes) down the diagonals or not illuminated at all.

FIG. 2B illustrates an exemplary "cross" pattern, in which one of the complementary subarray patterns 90a includes the hatched subarrays 60 and the other complementary subarray pattern 90b includes the clear subarrays 60. In the joint illumination mode, all subarrays 60 are illuminated by both the transmit and receive feeds in the microwave illumination system, while in the disjoint illumination mode, the subarrays 60 in the first complementary subarray pattern 90a are illuminated by the transmit feed and the subarrays 60 in the second complementary subarray pattern 90b are illuminated by the receive feed. The center subarray 60 (i.e., the subarray 60 that intersects both patterns 90a and 90b) can be illuminated in both illumination modes by randomly assigning substantially equal numbers of the antenna elements 80 to either joint mode or disjoint mode.

In one embodiment, one or more of the subarrays 60 is a dense subarray of antenna elements 80. In other embodiments, one or more of the subarrays 60 is a sparse subarray of antenna elements 80. For example, one or more of the subarrays 60 can contain a single row or column of densely populated or sparsely populated antenna elements 80. In either case, the complementary subarray patterns 90a and 90b together are composed of a vastly reduced number of antenna elements, such that the total number of antenna elements 80 in the sparse antenna array 50 is significantly reduced, as compared to a densely populated array. This reduction in element count directly translates into reduced cost. Thus, as opposed to dense arrays where the cost of the array is proportional to the footprint area (A) of the dense array, the cost of the complementary reduced-element count array, such as the ones shown in FIGS. 2A and 2B, is proportional to only the square root of A, which achieves a significant cost savings. In addition, AFOV is unchanged between the dense array and the complementary reduced-element count array because the overall extent of the complementary arrays and the minimum pitch is the same as for the originally dense array.

FIG. 3A is a schematic diagram of an exemplary illumination system 100 capable of operating in multiple illumination modes for use in the microwave imaging system of the present invention. The illumination system 100 includes the illumination network 140, the transmitter 130 and the receiver 135. In FIG. 3A, the illumination network 140 includes microwave horns 310, 320 and 330, phase plates 340, 342 and 344, circulator 350 and switches 360 and 370 for performing RF switching between the two illumination modes. Switch 360 is connected to the receiver 135 and selectively switches between horn 310 and circulator 350. Switch 370 is connected to the transmitter 130 and selectively switches between horn 330 and circulator 350. In FIG. 3A, the switches 360 and 370 are single-pole, double-throw (SPDT) microwave switches. However, in other embodiments, other types of switches could be used.

The central phase plate 342 is designed to illuminate the entire sparse geometry of both complementary subarray patterns in the joint illumination mode. The left phase plate 340 is designed to illuminate one of the complementary subarray patterns in the disjoint mode, while the right phase plate 344 is designed to illuminate the other complementary subarray pattern in the disjoint mode. The phase plates 340, 342 and 344 can operate either by reflection or transmission of microwave illumination to and from the horns 310, 320 and 330, respectively. In other embodiments, the horns 310, 320 and 330 are custom-designed far-field pattern horns, thereby dispensing with the need for phase plates 340, 342 and 344. For example, leaky waveguides, cylindrical lenses, cylindrical mirrors and other types of custom horns may be used with embodiments of the present invention.

In the joint illumination mode, both switches 360 and 370 connect to the circulator 350 to transmit and receive microwave radiation through the central horn 320 to produce the joint signal. In the disjoint illumination mode, switch 360 connects to horn 310 and switch 370 connects to horn 330 to transmit microwave radiation completely through the right horn 330 and receive microwave radiation completely through the left horn 310 to produce the disjoint signal. In one embodiment, the microwave imaging system is a coherent system, and thus narrowband. Therefore, switches 360 and 370 can be designed as narrowband switches to obtain a lower insertion loss performance than that achievable with general-purpose wideband microwave switches. As a result, any of the illumination system 100 configurations shown herein can be used with relatively low transmit power.

FIG. 3B is a schematic diagram of another exemplary illumination system 100 capable of operating in multiple illumination modes for use in the microwave imaging system of the present invention. The illumination system 100 includes the illumination network 140, the transmitter 130 and the receiver 135. In FIG. 3B, the illumination network 140 includes only a single microwave horn 320, corresponding phase plate 342 and circulator 350. The phase plate 342 is designed to illuminate the entire sparse geometry of both complementary subarray patterns in both the joint illumination mode and the disjoint illumination mode. The two illumination modes (joint and disjoint) are digitally implemented at the antenna array by inverting the phase shifts of the individual antenna elements in one of the complementary subarray patterns, while preserving the phase shifts of the individual antenna elements in the other complementary subarray pattern.

For example, in a binary array, each antenna element can only be programmed with one of two different binary states (e.g., 0 degree phase shift or 180 degree phase shift). In the joint illumination mode, the antenna elements in both of the complementary subarray patterns are first programmed with a respective phase shift (0 or 180 degrees) designed to produce constructive interference of the reflected microwave illumination at the receiver 135. In the disjoint illumination mode, the phase shift of each of the antenna elements in only one of the complementary subarray patterns is flipped (inverted), such that if a particular antenna element is programmed with a 0 degree phase shift during joint illumination, the phase shift of that particular antenna element is changed to 180 degrees for disjoint illumination. As an example, referring to FIG. 2A, in the disjoint illumination mode, the phase shifts of the antenna elements in subarray pattern 90*a* can be inverted, while maintaining the same phase shifts of the antenna elements in subarray pattern 90*b*.

As a result, the received microwave radiation reflected from the object and directed towards the illumination system 100 by the antenna array includes two independent channels, termed herein as a "plus" channel and a "minus" channel. The plus channel is equivalent to the joint illumination channel measured from the reflected microwave radiation received during the joint illumination mode. The minus channel is acquired by inverting the phase shifts of one of the subarray patterns during the disjoint illumination mode. However, the minus channel is not equivalent to the disjoint illumination channel. Instead, the disjoint illumination channel is equivalent to the difference between the plus channel and the minus channel. The disjoint channel can also be referred to as a "mixed" signal, while the addition of the plus channel and the minus channel can be referred to as a "pure" signal. Any appropriate linear combination of the plus channel signal and the minus channel signal or the pure channel signal and the mixed channel signal produces the optimal sidelobe cancellation.

FIGS. 4A-4C are pictorial representations of exemplary phase plates 340, 342 and 344 for use in the exemplary illumination system shown in FIGS. 3A and 3B. In FIGS. 4A-4C, the phase plates 340, 342 and 344 are binary phase zone plates, where white areas represent 0 degree phase shift zones and black areas represent 180 degree phase shift zones. In other embodiments, the phase plates 340, 342 and 344 are quaternary phase plates (0°, 90°, 180° and 270°) or continuous phase plates, such as a conventional Fresnel lens or an ordinary lens. The particular phase shift zone pattern on the phase plates 340, 342 and 344 is dependent upon the complementary subarray patterns of the array. For example, the "picture frame" pattern shown in FIG. 2A would require different phase plates than the "cross" pattern shown in FIG. 2B.

In general, the phase plates 340 and 344 for illuminating the individual complementary subarray patterns are nearly complementary (orthogonal) to each other to provide the proper phase shift between the transmit and receive beam patterns in the disjoint mode. The phase plate 342 for joint illumination is self-dual, i.e., a geometric operation (e.g., 90° rotation) which transforms the left plate 340 to the right plate 344 leaves the center plate 342 unchanged.

FIG. 5 is a schematic diagram of another exemplary illumination system 100 capable of operating in multiple illumination modes for use in the microwave imaging system of the present invention. In FIG. 5, the illumination network 140 includes two microwave horns 510 and 520, a variable phase plate 530, a fixed phase plate 540, circulator 550 and switch 560 for performing RF switching between the two illumination modes. Switch 560 is connected to the transmitter 130 and selectively switches between horn 520 and circulator 550. The receiver 135 is connected to the circulator 550, which is connected to horn 510 and selectively connected to switch 560.

The variable phase plate 530 is designed to illuminate the entire sparse geometry of both complementary subarray patterns in the joint illumination mode and one of the complementary subarray patterns in the disjoint mode, while the fixed phase plate 540 is designed to illuminate the other complementary subarray pattern in the disjoint mode. In the joint illumination mode, the variable phase plate 530 is programmed to illuminate the entire sparse geometry of both complementary subarray patterns of the antenna array and switch 560 is connected to the circulator 350 to transmit and receive microwave radiation through the left horn 510 and variable phase plate 530 to produce the joint signal.

In the disjoint illumination mode, switch 560 is connected to horn 520 and fixed phase plate 540 to transmit microwave radiation through horn 520 and fixed phase plate 540 to illuminate one of the complementary subarray patterns, and the variable phase plate 530 is programmed to illuminate the other complementary subarray patterns to receive microwave radiation through the variable phase plate 530 and horn 510 to produce the disjoint signal. It should be understood that the transmitter 130 and receiver 135 can be interchanged if the circulator 550 is left-right mirrored. Although using a single switch 560, as opposed to the multiple switches shown in FIGS. 3 and 6-9, may appear to produce poor isolation performance of the switch 560, the circulator 550 provides isolation to compensate for the poor isolation performance of the switch 560, and therefore, any type of microwave switch can be used. Conversely, the insertion loss performance of switch 560 is relaxed compared to FIGS. 3 and 6-9.

In another embodiment, the variable phase plate 530 is replaced by a fixed phase plate that illuminates the entire sparse geometry of the complementary subarray patterns. When switch 560 connects to the circulator 550, the joint illumination mode operates in the same manner as described above. However, when switch 560 connects to horn 520, the disjoint illumination mode is implemented with an efficiency penalty factor of two.

Figure 6:
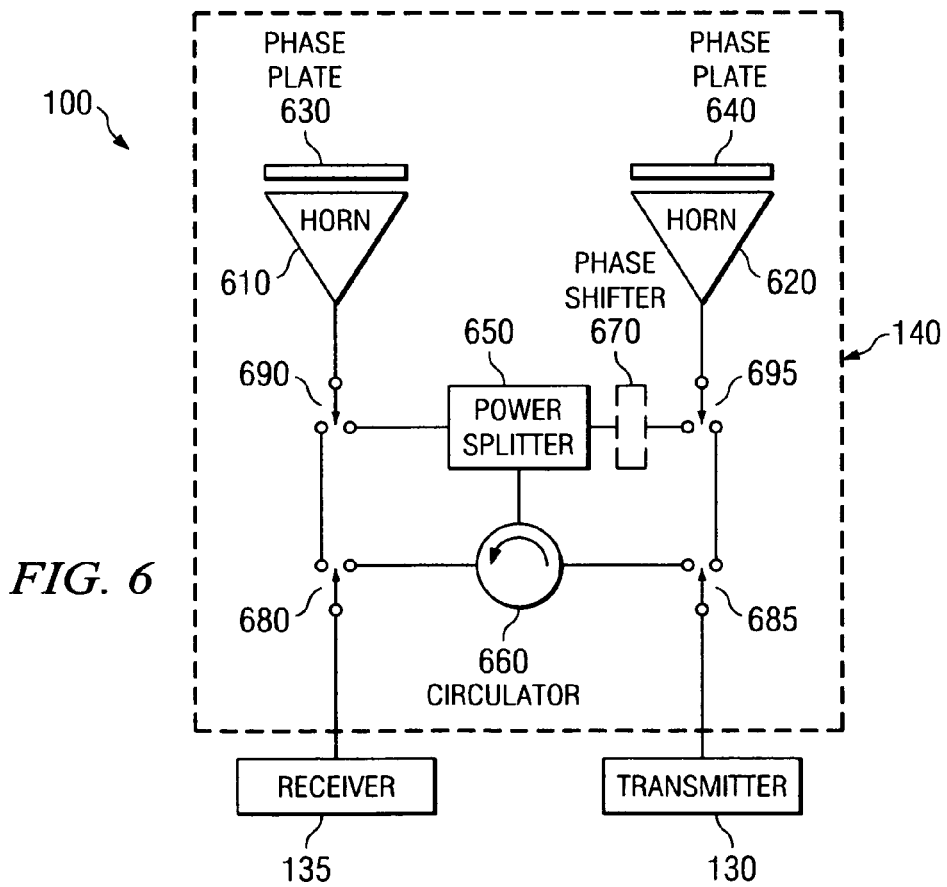
FIG. 6 is a schematic diagram of another exemplary illumination system capable of operating in multiple illumination modes for use in the microwave imaging system of the present invention.

FIG. 6 is a schematic diagram of another exemplary illumination system 100 capable of operating in multiple illumination modes for use in the microwave imaging system of the present invention. In FIG. 6, the illumination network 140 includes two microwave horns 610 and 620, phase plates 630 and 640, a 50/50 power splitter/combiner 650, circulator 660, an optional phase shifter 670 and switches 680, 685, 690 and 695 for performing RF switching between the two illumination modes. Switch 680 is connected to the receiver 135 and selectively switches between the circulator 660 and an outer transmission line towards horn 610. Switch 685 is connected to the transmitter 130 and selectively switches between an outer transmission line towards horn 620 and circulator 660. Switch 690 is connected to horn 610 and selectively switches between the outer transmission line towards the receiver 135 and the power splitter 650. Switch 695 is connected to horn 620 and selectively switches between the outer transmission line towards transmitter 130 and the power splitter 650 (via the optional phase shifter 670).

One phase plate 630 is designed to illuminate the one of the complementary subarray patterns, while the other phase plate 640 is designed to illuminate the other complementary subarray pattern. In the joint illumination mode, the switches 680 and 685 are connected to the circulator 660 and the switches 690 and 695 are connected to the power splitter 650 so that microwave radiation is both transmitted 50/50 and received 50/50 between the two horns 610 and 620 and corresponding phase plates 630 and 640 to produce the joint signal. If the subarray pattern partial illuminations from horns 610 and 620 are exactly complementary, there is no interference on the array and the phase shifter 670 is unnecessary. However, if there is a residual overlap of the partial illuminations, the phase shifter 570 can be adjusted to optimize the illumination in the overlap regions.

In the disjoint illumination mode, switches 680, 685, 690 and 695 are connected to the outer transmission lines to connect horn 610 with the receiver 135 and to connect horn 620 with the transmitter 130 to transmit microwave radiation completely through horn 620 and phase plate 640 and receive microwave radiation completely through horn 610 and phase plate 630 to produce the disjoint signal. It should be understood that the transmitter 130 and receiver 135 can be interchanged if the circulator 660 is left-right mirrored.

Figure 7:
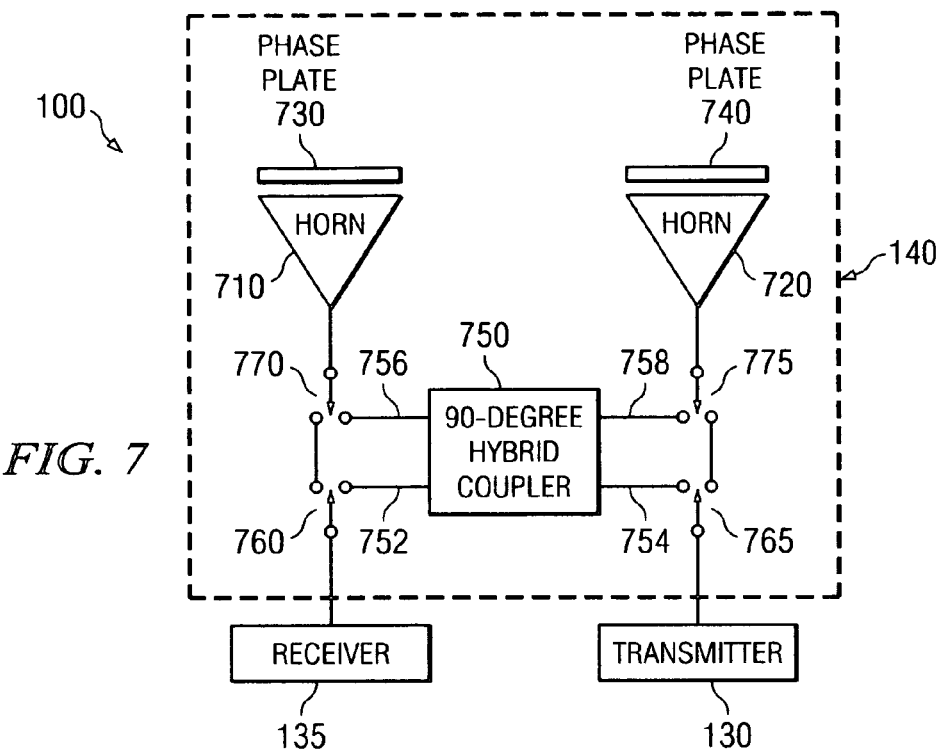
FIG. 7 is a schematic diagram of another exemplary illumination system capable of operating in multiple illumination modes for use in the microwave imaging system of the present invention.

FIG. 7 is a schematic diagram of another exemplary illumination system 100 capable of operating in multiple illumination modes for use in the microwave imaging system of the present invention. In FIG. 7, the illumination network 140 includes two microwave horns 710 and 720, phase plates 730 and 740, a 90-degree hybrid coupler 750 and switches 760, 765, 770 and 775 for performing RF switching between the two illumination modes. Switch 760 is connected to the receiver 135 and selectively switches between an outer transmission line towards horn 710 and lower left arm 752 of the 90-degree hybrid coupler 750. Switch 765 is connected to the transmitter 130 and selectively switches between an outer transmission line toward horn 720 and lower right arm 754 of the 90-degree hybrid coupler 750. Switch 770 is connected to horn 710 and selectively switches between the outer transmission line towards the receiver 135 and upper left arm 756 of the 90-degree hybrid coupler 750. Switch 775 is connected to horn 720 and selectively switches between the outer transmission line towards transmitter 130 and upper right arm 758 of the 90-degree hybrid coupler 750.

One phase plate 730 is designed to illuminate the one of the complementary subarray patterns, while the other phase plate 740 is designed to illuminate the other complementary subarray pattern. In the disjoint illumination mode, switches 760, 765, 770 and 775 are connected to the outer transmission lines to connect horn 710 with the receiver 135 and to connect horn 720 with the transmitter 130 to transmit microwave radiation completely through horn 720 and phase plate 740 and receive microwave radiation completely through horn 710 and phase plate 730 to produce the disjoint signal.

In the joint illumination mode, switches 760 and 765 are connected to the respective lower arms 752 and 745 of the 90 degree hybrid coupler 750, and switches 770 and 775 are connected to the respective upper arms 756 and 758 of the 90-degree hybrid coupler 750. Microwave radiation from the transmitter 130 enters the lower right arm 754 of the 90-degree hybrid coupler 750 and is transmitted 50/50 out of the two upper arms 756 and 758 towards horns 710 and 720. The microwave radiation output from the upper left arm 756 is rotated 90 degrees with respect to the microwave radiation output from the upper right arm 758.

The received microwave radiation reflected from the object and directed towards the illumination system 100 by the antenna array includes four different channels: L-O-L, R-O-R, L-O-R and R-O-L, where L is the left horn 710, R is the right horn 720 and O is the object being imaged. The L-O-L and R-O-R channels are "pure" channels, and the L-O-R and R-O-L channels are "mixed" channels. All four channels are received at the illumination network 140 in phase with each other, provided an optional phase shifter (not shown) is correctly set. However, the 90-degree hybrid coupler 750 only delivers the "pure" channels to the receiver 135 due to the 90 degree phase shift between the arms. The "mixed" channels are routed back to the transmitter 130 and not received. However, since the "mixed" channels are substantially equivalent to the disjoint mode signal, the joint signal ("pure"+"mixed") can be computed from a simple linear combination of the "pure" channel signal and the disjoint signal obtained during the disjoint illumination mode.

Figure 8:
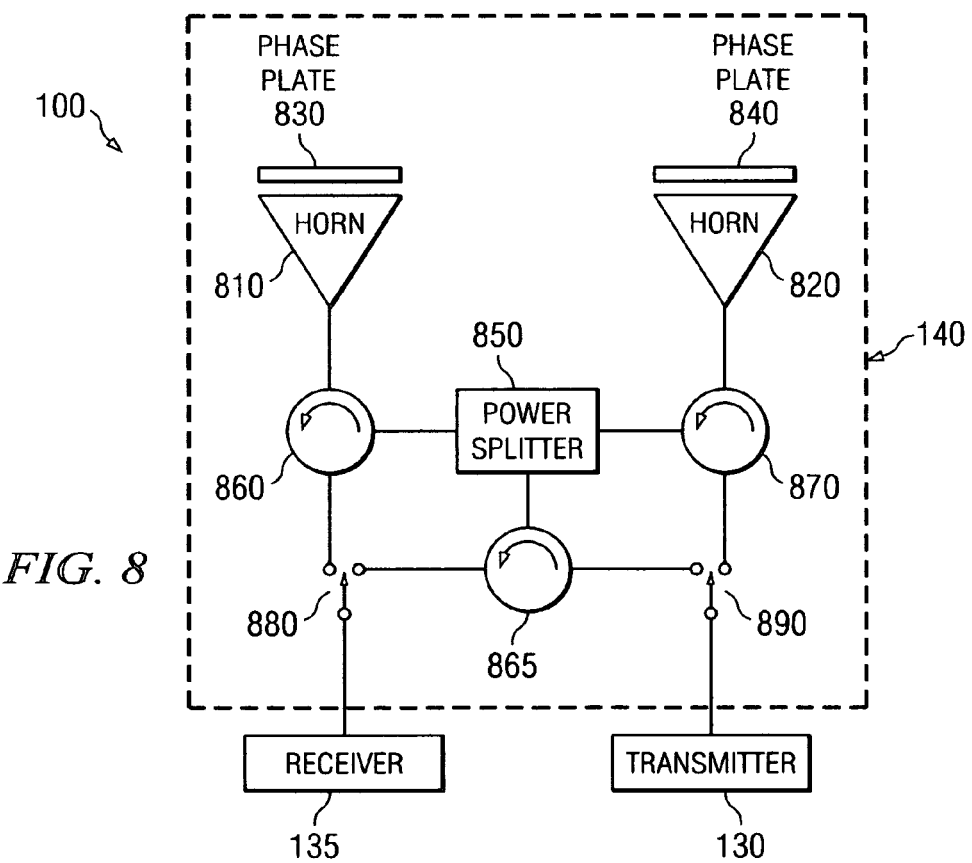
FIG. 8 is a schematic diagram of another exemplary illumination system capable of operating in multiple illumination modes for use in the microwave imaging system of the present invention.

FIG. 8 is a schematic diagram of another exemplary illumination system 100 capable of operating in multiple illumination modes for use in the microwave imaging system of the present invention. In FIG. 8, the illumination network 140 includes two microwave horns 810 and 820, phase plates 830 and 840, a 50/50 power splitter/combiner 850, circulators 860, 865 and 870 and switches 880 and 980 for performing RF switching between the two illumination modes. Switch 880 is connected to the receiver 135 and selectively switches between circulator 860 and circulator 865. Switch 890 is connected to the transmitter 130 and selectively switches between circulator 870 and circulator 865. Circulator 860 is connected to horn 801 and circulator 870 is connected to horn 820. The power splitter 850 is connected to circulators 860, 865 and 870.

One phase plate 830 is designed to illuminate the one of the complementary subarray patterns, while the other phase plate 840 is designed to illuminate the other complementary subarray pattern. In the joint illumination mode, switches 880 and 890 are connected to circulator 865 so that microwave radiation is transmitted 50/50 between the two horns 810 and 820 via circulator 865 and power splitter 850 directly through circulator 860 and by way of bouncing off the reflective open switch terminal at circulator 870. Microwave radiation is also received 50/50 between the two horns 810 and 820, directly through circulator 870 and by way of bouncing off the reflective open switch terminal at circulator 860, to produce the joint signal.

In the disjoint illumination mode, switches 880 and 890 are connected to circulators 860 and 870, respectively, to connect horn 810 with the receiver 135 and to connect horn 820 with the transmitter 130 to transmit microwave radiation completely through horn 820 and phase plate 840 and receive microwave radiation completely through horn 810 and phase plate 830 to produce the disjoint signal. An optional phase shifter may also be included to optimize illumination in the overlap regions.

Figure 9:
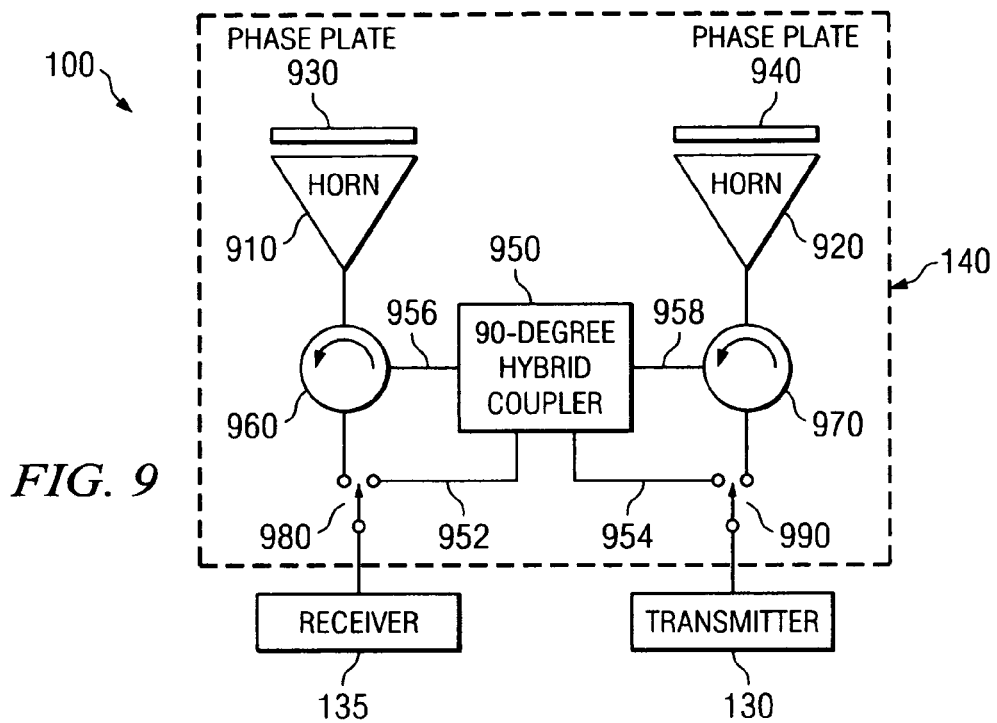
FIG. 9 is a schematic diagram of another exemplary illumination system capable of operating in multiple illumination modes for use in the microwave imaging system of the present invention.

FIG. 9 is a schematic diagram of another exemplary illumination system capable of operating in multiple illumination modes for use in the microwave imaging system of the present invention. In FIG. 9, the illumination network 140 includes two microwave horns 910 and 920, phase plates 930 and 940, a 90-degree hybrid coupler 950, circulators 960 and 970 and switches 980 and 990 for performing RF switching between the two illumination modes. Switch 980 is connected to the receiver 135 and selectively switches between circulator 960 and lower left arm 952 of the 90-degree hybrid coupler 950. Switch 990 is connected to the transmitter 130 and selectively switches between circulator 970 and lower right arm 954 of the 90-degree hybrid coupler 950. Circulator 960 is connected to horn 910 and upper left arm 956 of the 90-degree hybrid coupler 950. Circulator 970 is connected to horn 920 and upper right arm 958 of the 90-degree hybrid coupler 950.

One phase plate 930 is designed to illuminate the one of the complementary subarray patterns, while the other phase plate 940 is designed to illuminate the other complementary subarray pattern. In the disjoint illumination mode, switches 980 and 990 are connected to circulators 960 and 970, respectively, to connect horn 910 with the receiver 135 and to connect horn 920 with the transmitter 130 to transmit microwave radiation completely through horn 920 and phase plate 940 and receive microwave radiation completely through horn 910 and phase plate 930 to produce the disjoint signal. In the joint illumination mode, switches 980 and 990 are connected to the respective lower arms 952 and 945 of the 90-degree hybrid coupler 950 to transmit microwave radiation 50/50 between both horns 910 and 920, as described above in connection with FIG. 7, to produce the joint signal.

Figure 10:
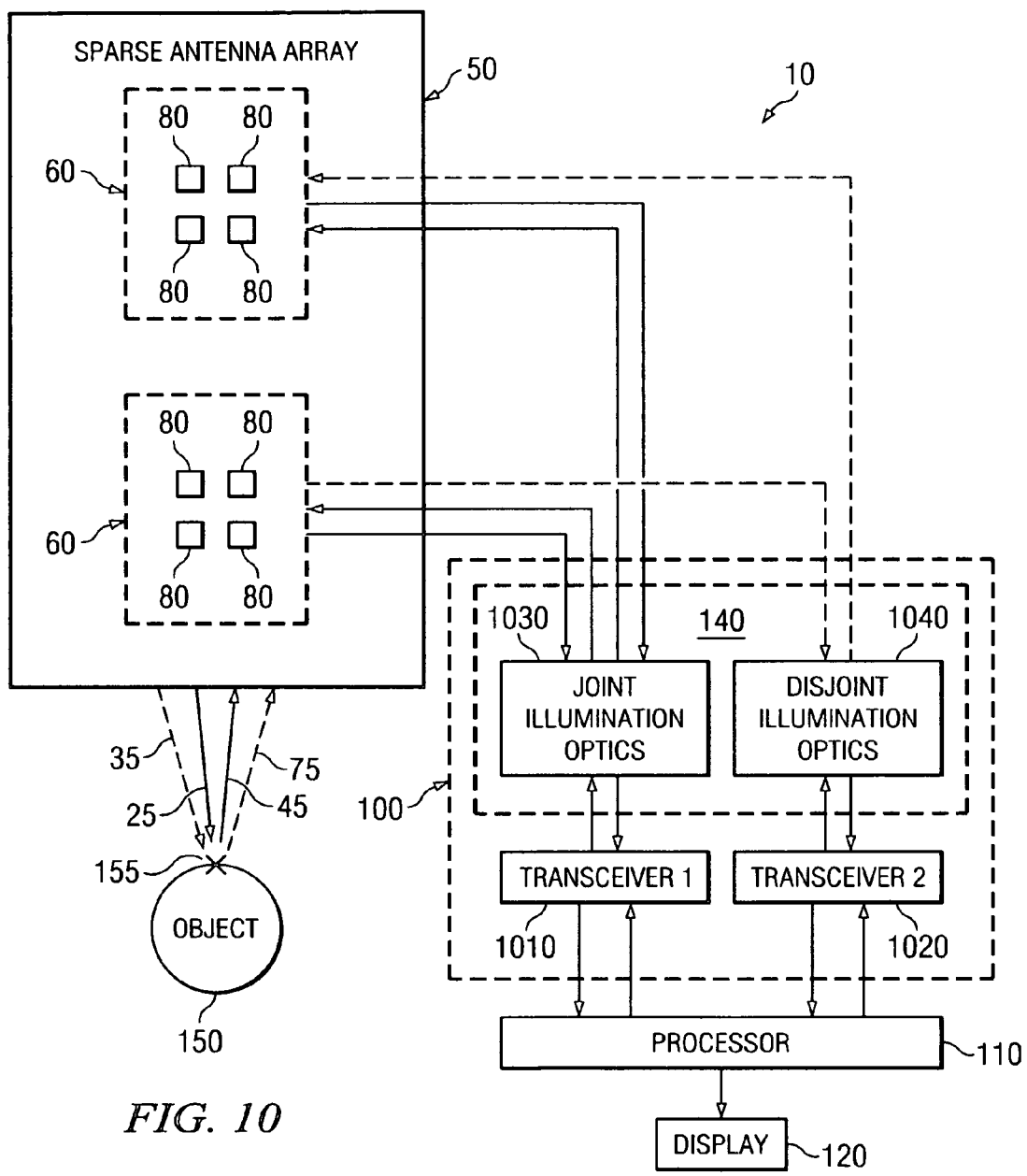
FIG. 10 is a schematic diagram of another simplified exemplary microwave imaging system for capturing a microwave image of an object with suppressed sidelobes using a sparse antenna array, in accordance with embodiments of the present invention.

FIG. 10 is a schematic diagram of another simplified exemplary microwave imaging system 10 for capturing a microwave image of an object 150 with suppressed sidelobes using a sparse antenna array 50, in accordance with embodiments of the present invention. The microwave imaging system 10 shown in FIG. 10 is similar to the microwave imaging system shown in FIG. 1, except that the illumination system 100 includes two transceivers 1010 and 1020, each including a transmitter and a receiver, and the illumination network 140 includes joint illumination optics 1030 and disjoint illumination optics 1040.

One transceiver (e.g., transceiver 1010) illuminates the sparse array 50 through joint illumination optics 1030 (e.g., horns and phase plates), while the other transceiver 1020 illuminates the sparse array 50 through disjoint illumination optics 1040. Thus, in the joint mode, the subarrays 60 in both of the complementary subarray patterns 90*a* and 90*b* are illuminated by both the transmit feed and the receive feed of transceiver 1030. In disjoint mode, the subarrays 60 in a first complementary subarray pattern 90*a* are illuminated by the transmit feed of transceiver 1020, and the subarrays 60 in a second complementary subarray pattern 90*b* are illuminated by the receive feed of transceiver 1020. The processor 110 acts as a controller, switching between transceivers 1010 and 1020.

In another embodiment, the joint illumination optics 1030 and disjoint illumination optics 1040 can be combined, as in FIG. 6 or 7, to enable both receivers in the transceivers 1010 and 1020 to receive at all times. The processor 110 switches between transmit (joint vs. disjoint) modes, either with one transmitter (e.g., a single transmitter as shown in FIG. 6 or 7) or between the two transmitters of transceivers 1010 and 1020 shown in FIG. 10. Over the two modes, the two receivers receive four different complex values (2 receivers×2 modes) that can be linearly combined in the processor 110 to form the final signal.

Figure 11:
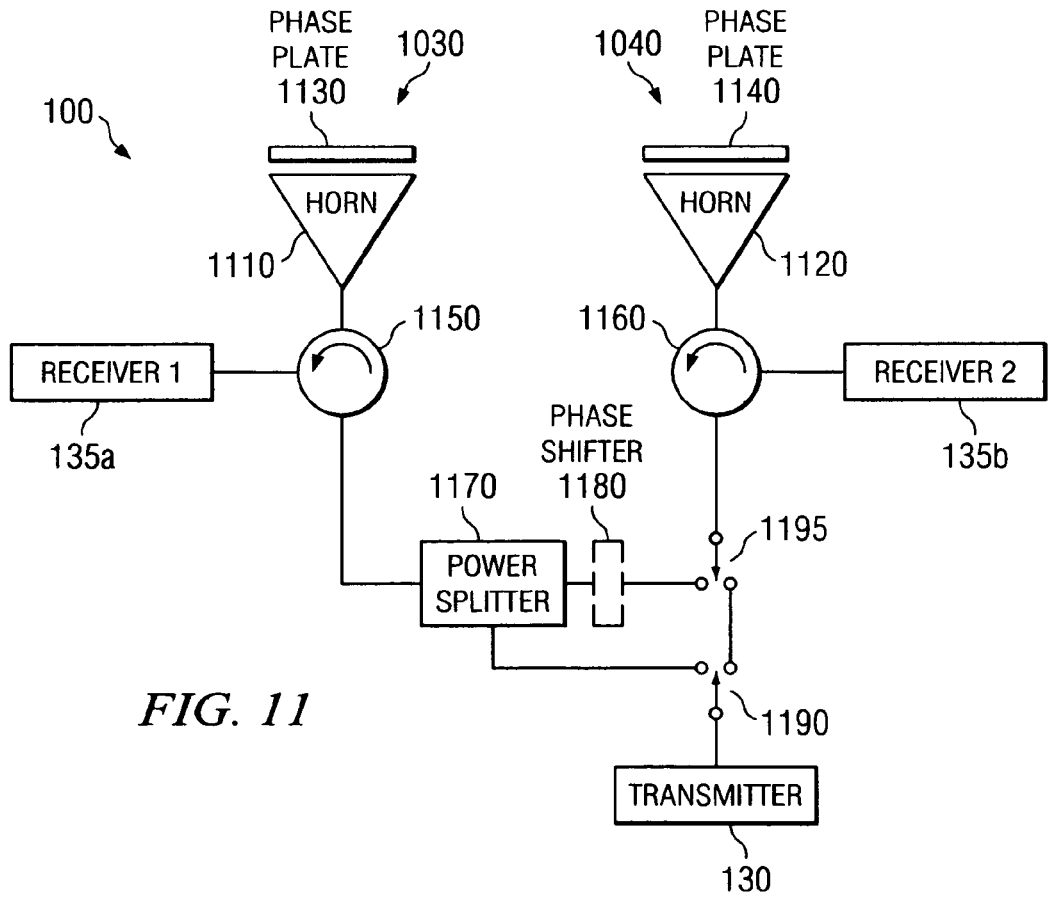
FIG. 11 is a schematic diagram of an exemplary illumination system capable of operating in multiple illumination modes for use in the microwave imaging system of FIG. 10.

FIG. 11 is a schematic diagram of an exemplary illumination system 100 capable of operating in multiple illumination modes for use in the microwave imaging system 10 of FIG. 10. In FIG. 11, the illumination system 100 includes two receivers 135*a* and 135*b*, one transmitter 130, microwave horns 1110 and 1120, phase plates 1130 and 1140, circulators 1150 and 1160, a 50/50 power splitter/combiner 1170, an optional phase shifter 1180 and switches 1190 and 1195 for performing RF switching between the two illumination modes. Circulator 1150 is connected to horn 1110, receiver 135*a* and power splitter 1170. Circulator 1160 is connected to horn 1120 and receiver 135*b*. Switch 1190 is connected to the transmitter 130 and selectively switches between the power splitter 1170 and an outer transmission line towards horn 1120. Switch 1195 is connected to circulator 1160 and selectively switches between the outer transmission line between horn 1120 and transmitter 130 and power splitter 1170.

One phase plate 1130 is designed to illuminate the one of the complementary subarray patterns, while the other phase plate 1140 is designed to illuminate the other complementary subarray pattern. In the disjoint illumination mode, switches 1190 and 1195 connect to the transmission line connecting transmitter 130 and horn 1120, and only the signal from receiver 135*a* is selected to produce the disjoint signal. The signal from receiver 135*b* is ignored. In the joint illumination mode, switches 1190 and 1195 are connected to the power splitter 1170 so that microwave radiation is both transmitted 50/50 and received 50/50 between the two horns 1110 and 1120 and corresponding phase plates 1130 and 1140, and received at both receivers 135*a* and 135*b* to produce two joint signals (joint R1 and joint R2). The processor determines the value of a pixel or voxel corresponding to the target by forming an appropriate complex linear combination of the three signals (disjoint, joint R1 and joint R2). With the switches 1190 and 1195 only in the transmit path (and not the receive path), any switch insertion loss can be overcome by increasing the transmit power without violating broadcast power regulatory limits.

Figure 12:
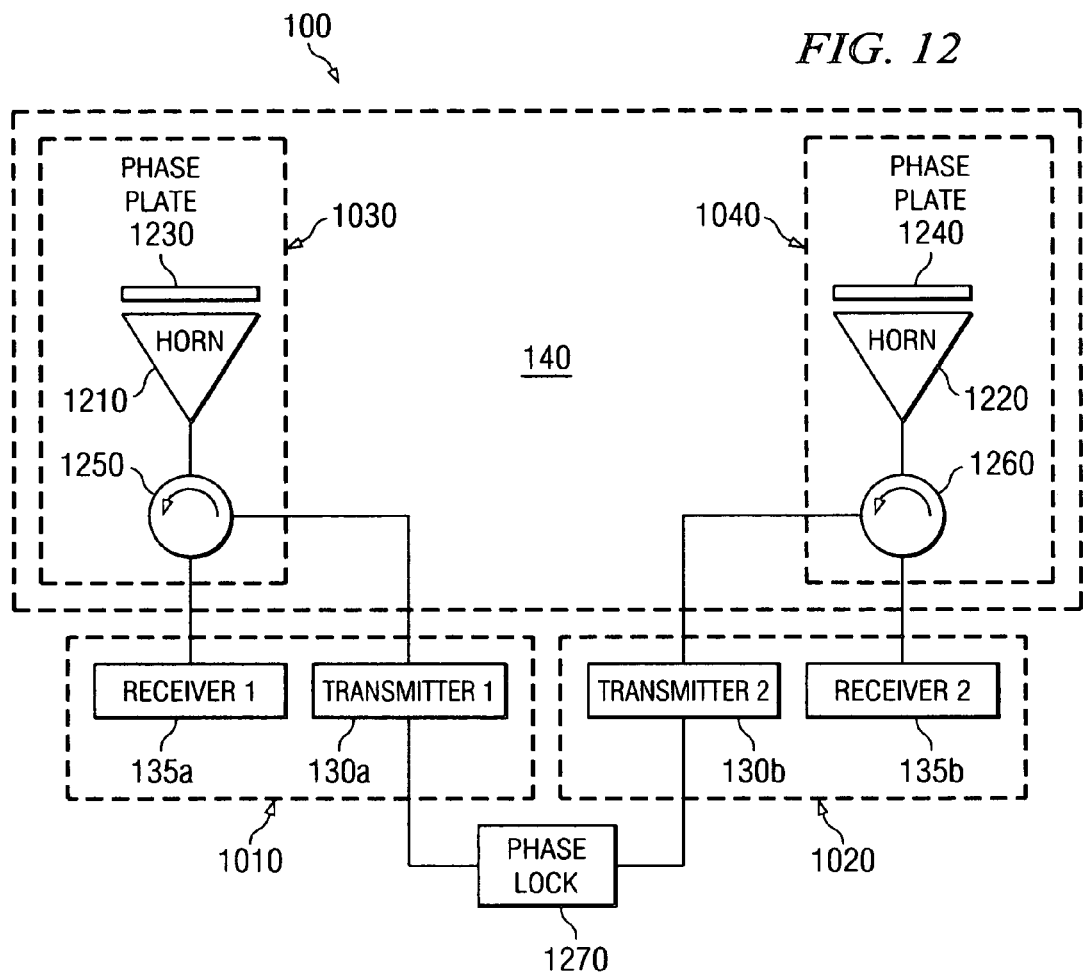
FIG. 12 is a schematic diagram of another exemplary illumination system capable of operating in multiple illumination modes for use in the microwave imaging system of FIG. 10.

FIG. 12 is a schematic diagram of another exemplary illumination system 100 capable of operating in multiple illumination modes for use in the microwave imaging system 10 of FIG. 10. In FIG. 12, the illumination system 100 includes two transceivers 1010 and 1020, each having a respective receiver 135*a* and 135*b* and a respective transmitter 130*a* and 130*b*, phase lock 1270 to phase lock transmitters 130*a* and 130*b*, joint optics 1030 and disjoint optics 1040. The joint optics 1030 includes microwave horn 1210, phase plate 1230 and circulator 1250. The disjoint optics 1040 includes microwave horn 1220, phase plate 1240 and circulator 1260. Circulator 1250 is connected to horn 1210, receiver 135*a* (R1) and transmitter 130*a* (T1). Circulator 1260 is connected to horn 1220, receiver 135*b* (R2) and transmitter 130*b* (T2).

One phase plate 1230 is designed to illuminate the one of the complementary subarray patterns, while the other phase plate 1240 is designed to illuminate the other complementary subarray pattern. In one disjoint illumination mode embodiment, T2 130*b* and R1 135*a* are selected to produce the disjoint signal, T1 130*a* is off and the signal from R2 135*b* is ignored. In another disjoint illumination mode embodiment, T1 130*a* and R2 135*b* are selected to produce the disjoint signal, T2 130*b* is off and the signal from R1 135*a* is ignored. In the joint illumination mode, both transmitters 130*a* and 130*b* and both receivers 135*a* and 135*b* are used to produce two joint signals (joint R1 and joint R2). The processor again determines the value of a pixel or voxel corresponding to the target by forming an appropriate complex linear combination of the three signals (disjoint, joint R1 and joint R2).

Figure 13:
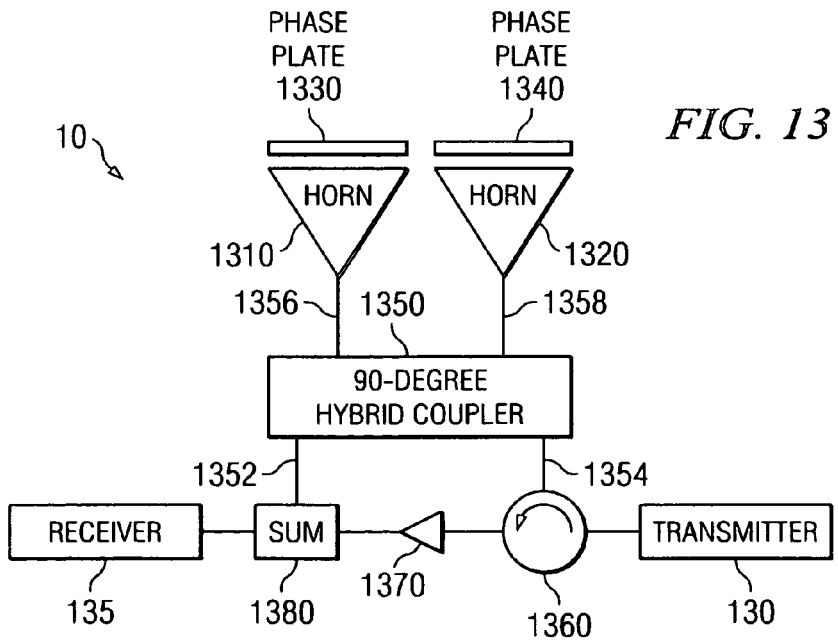
FIG. 13 is a schematic diagram of another exemplary illumination system capable of operating in multiple illumination modes for use in the microwave imaging system of FIG. 10.

FIG. 13 is a schematic diagram of another exemplary illumination system 100 capable of operating in multiple illumination modes without switches for use in the microwave imaging system 10 of FIG. 10. In FIG. 13, the illumination system 100 includes summing receiver (shown as receiver 135 and summation node 1380), transmitter 130, microwave horns 1310 and 1320, phase plates 1330 and 1340, a 90-degree hybrid coupler 1350, circulator 1360 and variable (gain and phase) amplifier 1370. Circulator 1360 is connected to the transmitter 130, variable amplifier 1370 and the lower right arm 1354 of the 90-degree hybrid coupler 1350. The summing receiver 135 and 1380 is connected to the variable gain amplifier 1370 and the lower left arm 1352 of the 90-degree hybrid coupler 1350. Horn 1310 is connected to upper left arm 1356 of the 90-degree hybrid coupler 1350, and horn 1320 is connected to upper right arm 1358 of the 90-degree hybrid coupler 1350.

One phase plate 1330 is designed to illuminate one of the complementary subarray patterns, while the other phase plate 1340 is designed to illuminate the other complementary subarray pattern. In FIG. 13, joint and disjoint illumination modes are performed substantially simultaneously using the summation node 1380. The variable amplifier 1370 provides an appropriate linear combination of the "pure" and "mixed" signals that is equivalent to a linear combination of the joint and disjoint modes to the summing receiver 135 and 1380. For example, to generate a 50/50 joint+disjoint distribution as shown in FIG. 14, the voltage gain should be set to three. In one embodiment, the summing receiver 135 and 1380 is implemented with analog amplification and combining (as shown in FIG. 13). In another embodiment, the summing receiver 135 and 1380 is implemented using two receivers followed by digital multiplication and addition. In yet another embodiment, a single receiver can be used and a single switch can select either the lower left arm 1352 of the 90-degree hybrid coupler 1350 or the lower left port of the circulator 1360, followed by digital multiplication and addition.

Figure 15:
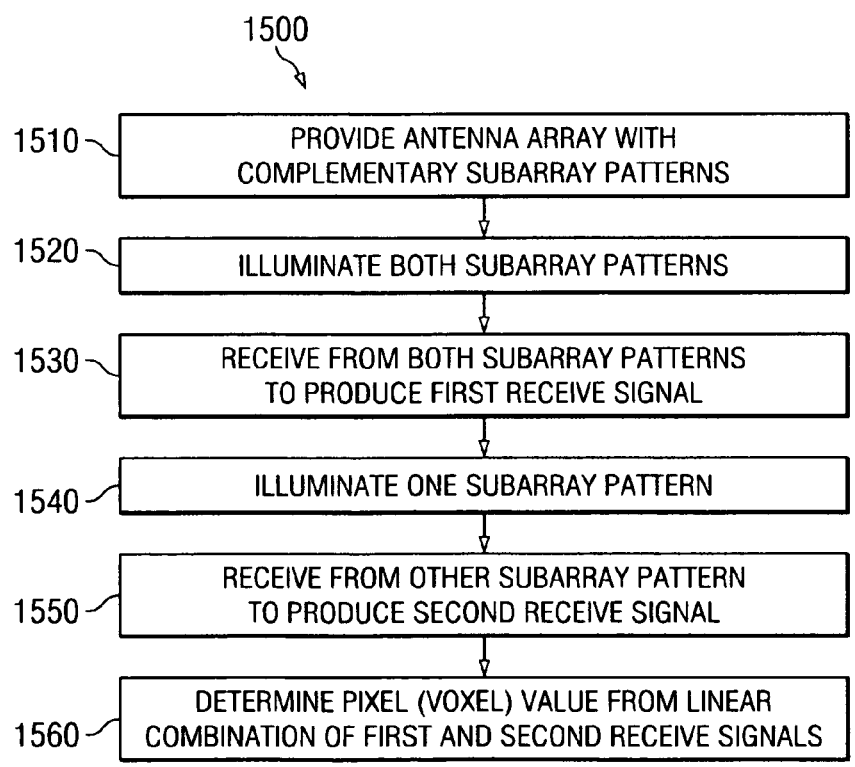
FIG. 15 is a flow chart illustrating an exemplary process for capturing a microwave image of a target of an object, in accordance with embodiments of the present invention.

FIG. 15 is a flow chart illustrating an exemplary process 1500 for capturing a microwave image of a target on an object, in accordance with embodiments of the present invention. Initially, at block 1510, an antenna array including a plurality of antenna elements arranged in complementary subarray patterns in a sparse geometry is provided. At bock 1520, both of the complementary subarray patterns of the antenna array are illuminated to direct a first transmit beam of microwave illumination towards the target. Thereafter, at block 1530, a first reflect beam of reflected microwave illumination reflected by the target is received from both of the complementary subarray patterns of the antenna array to produce a first receive signal in a first mode. At block 1540, a first one of the complementary subarray patterns of the antenna array is illuminated to direct a second transmit beam of microwave illumination towards the target. Thereafter, at block 1550, a second reflect beam of reflected microwave illumination is received from a second one of the complementary subarray patterns of the antenna array to produce a second receive signal in a second mode. Finally, at block 1560, the value of a pixel or voxel associated with the target representing an intensity of the reflected microwave illumination reflected from the target is determined as a linear combination of the first receive signal and the second receive signal. This process can be repeated for each pixel or voxel in the image, or alternatively, as described below in connection with FIGS. 16 and 17, to reduce the amount of switching, all pixels or voxels in an image can be scanned in one illumination mode before switching to the other illumination mode.

Figure 16:
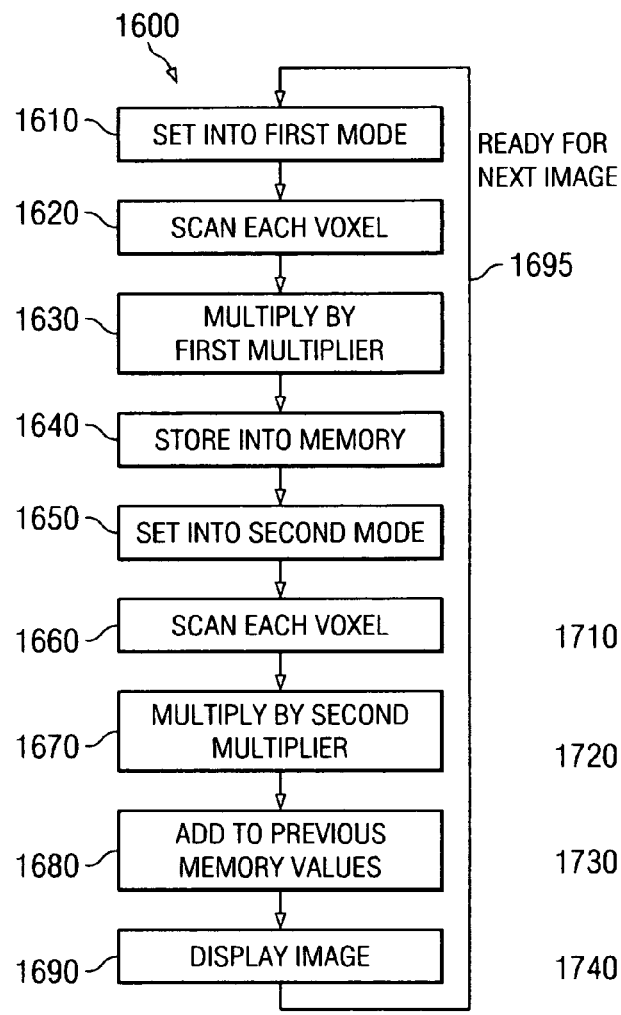
FIG. 16 is a flow chart illustrating an exemplary process for capturing a microwave image of an object, in accordance with embodiments of the present invention.

FIG. 16 is a flow chart illustrating an exemplary process 1600 for capturing a microwave image of an object using a sparse antenna array including complementary subarray patterns of antenna elements, in accordance with embodiments of the present invention. Initially, at block 1610, the microwave imaging system is set to a first illumination mode (i.e., either joint or disjoint). For example, in embodiments where switches are used to switch between the illumination modes, at block 1610, the switches are set to implement the first illumination mode. Thereafter, at block 1620, each pixel or voxel in the microwave image of the object is scanned (i.e., each target is imaged) in the first illumination mode to produce respective first mode signals for each pixel or voxel. At block 1630, each first mode signal is multiplied by a first multiplier that provides the appropriate weight to the first mode signals, and the resulting weighted first mode signals are stored in memory at block 1640.

At block 1650, the microwave imaging system is set to a second illumination mode (i.e., either joint or disjoint). For example, in embodiments where switches are used to switch between the illumination modes, at block 1650, the switches are set to implement the second illumination mode. Thereafter, at block 1660, each pixel or voxel in the microwave image of the object is scanned (i.e., each target is imaged) in the second illumination mode to produce respective second mode signals for each pixel or voxel. At block 1670, each second mode signal is multiplied by a second multiplier that provides the appropriate weight to the second mode signals, and the resulting weighted second mode signals are added to the respective weighted first mode signals for each pixel or voxel at block 1680 to produce a value for each pixel or voxel in the microwave image. At block 1690, the microwave image of the object can be displayed using the pixel/voxel values. This process is repeated at 1695 for each scanned object to produce a respective microwave image for each object.

Figure 17:
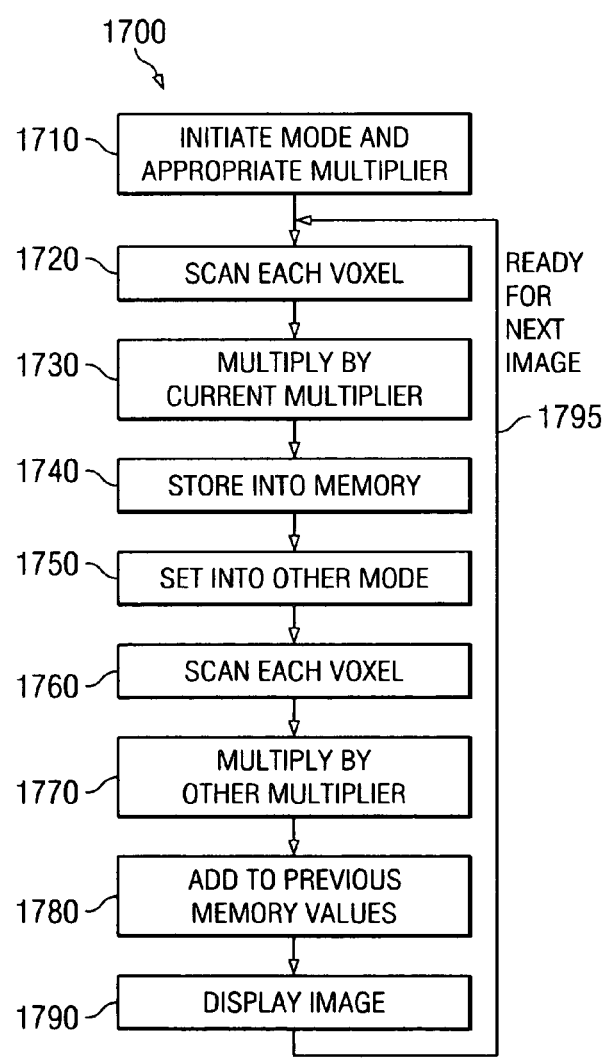
FIG. 17 is a flow chart illustrating another exemplary process for capturing a microwave image of an object, in accordance with embodiments of the present invention.

FIG. 17 is a flow chart illustrating another exemplary process 1700 with reduced switching events between microwave images of objects captured using a sparse antenna array including complementary subarray patterns of antenna elements, in accordance with embodiments of the present invention. Initially, at block 1710, an initial illumination mode (i.e., either joint or disjoint) is selected as a current illumination mode and an appropriate multiplier for the current mode is determined. Thereafter, at block 1720, each pixel or voxel in the microwave image of the object is scanned (i.e., each target is imaged) in the current illumination mode to produce respective first signals for each pixel or voxel. At block 1730, each first signal is multiplied by the multiplier for the current mode, and the resulting weighted first signals are stored in memory at block 1740.

At block 1750, the other illumination mode (i.e., either joint or disjoint) is selected as the current illumination mode, and at block 1760, each pixel or voxel in the microwave image of the object is scanned (i.e., each target is imaged) in the current illumination mode to produce respective second signals for each pixel or voxel. At block 1770, each second signal is multiplied by the multiplier for the current illumination mode, and the resulting weighted second signals are added to the respective weighted first signals for each pixel or voxel at block 1780 to produce a value for each pixel or voxel in the microwave image. At block 1790, the microwave image of the object can be displayed using the pixel/voxel values. This process repeats at 1795 to block 1720, in which the illumination mode that produced the second signals at block 1760 is used as the current illumination mode at block 1720 for the next scanned object.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. An illumination system within a microwave imaging system for illuminating an antenna array including antenna elements for directing microwave illumination to and from a target to capture a microwave image of said target, said antenna array including subarrays of said antenna elements arranged in a sparse geometry to form complementary subarray patterns of said antenna array, said illumination system comprising:
   a transmitter operable to transmit microwave illumination towards said antenna array;
   a receiver operable to receive from said antenna array reflected microwave illumination reflected from said target; and
   an illumination network operable in a first mode to transmit said microwave illumination from said transmitter to both of said complementary patterns of said antenna array and provide said reflected microwave illumination from both of said complementary subarray patterns of said antenna array to said receiver, wherein said illumination network is further operable in a second mode to transmit said microwave illumination from said transmitter to a first one of said complementary subarray patterns of said antenna array and provide said reflected microwave illumination from a second one of said complementary subarray patterns of said antenna array to said receiver.

2. The illumination system of claim 1, wherein said illumination network includes at least two microwave horns for illuminating said complementary subarray patterns of said antenna array.

3. The illumination system of claim 2, wherein said illumination network further includes a respective phase plate for each of said at least two microwave horns, and wherein said respective phase plates are operable to generate complementary illumination patterns to illuminate said complementary patterns of said antenna array.

4. The illumination system of claim 3, wherein said illumination network includes a first microwave horn operably connected to a first phase plate to generate a first illumination pattern for illuminating said first complementary subarray pattern of said antenna array, a second microwave horn operably connected to a second phase plate to generate a second illumination pattern for illuminating said second complementary subarray pattern of said antenna array and a third microwave horn operably connected to a third phase plate to generate a third illumination pattern for illuminating both said complementary subarray patterns of said antenna array.

5. The illumination system of claim 4, wherein said illumination network further includes a circulator connected to said third horn, a first switch connected to said receiver and arranged to selectively connect to said circulator in said first mode and said first horn in said second mode and a second switch connected to said transmitter and arranged to selectively connect to said circulator in said first mode and said second horn in said second mode.

6. The illumination system of claim 3, wherein said illumination network includes a first microwave horn operably connected to a fixed phase plate to generate a first illumination pattern for illuminating said first complementary subarray pattern of said antenna array and a second microwave horn operably connected to a variable phase plate to generate a second illumination pattern for illuminating said second complementary subarray pattern of said antenna array and a third illumination pattern for illuminating both said complementary subarray patterns of said antenna array.

7. The illumination system of claim 6, wherein said illumination network further includes a circulator connected between said receiver and said second horn and switch connected to said transmitter and arranged to selectively connect to said circulator in said first mode and said second horn in said second mode.

8. The illumination system of claim 3, wherein said illumination network includes a first microwave horn operably connected to a first phase plate to generate a first illumination pattern for illuminating said first complementary subarray pattern of said antenna array and a second microwave horn operably connected to a second phase plate to generate a second illumination pattern for illuminating said second complementary subarray pattern of said antenna array.

9. The illumination system of claim 8, wherein said illumination network further includes a power splitter connected to a circulator, a first switch connected to said receiver and arranged to selectively connect to said circulator in said first mode and said first horn in said second mode, a second switch connected to said transmitter and arranged to selectively connect to said circulator in said first mode and said second horn in said second mode, a third switch connected to said first horn and arranged to selectively connect to said power splitter in said first mode and said receiver in said second mode and a fourth switch connected to said second horn and arranged to selectively connect to said power splitter in said first mode and said transmitter in said second mode.

10. The illumination system of claim 8, wherein said illumination network further includes a 90-degree hybrid coupler, a first switch connected to said receiver and arranged to selectively connect to said 90-degree hybrid coupler in said first mode and said first horn in said second mode, a second switch connected to said transmitter and arranged to selectively connect to said 90-degree hybrid coupler in said first mode and said second horn in said second mode, a third switch connected to said first horn and arranged to selectively connect to said 90-degree hybrid coupler in said first mode and said receiver in said second mode and a fourth switch connected to said second horn and arranged to selectively connect to said 90-degree hybrid coupler in said first mode and said transmitter in said second mode.

11. The illumination system of claim 8, wherein said illumination network further includes a first circulator connected to said first horn, a second circulator connected to said second horn, a power splitter connected to said first circulator, said second circulator and a third circulator, a first switch connected to said receiver and arranged to selectively connect to said third circulator in said first mode and said first circulator in said second mode and a second switch connected to said transmitter and arranged to selectively connect to said third circulator in said first mode and said second circulator in said second mode.

12. The illumination system of claim 8, wherein said illumination network further includes a first circulator connected to said first horn, a second circulator connected to said second horn, a 90-degree hybrid coupler connected to said first circulator and said second circulator, a first switch connected to said receiver and arranged to selectively connect to said 90-degree hybrid coupler in said first mode and said first circulator in said second mode and a second switch connected to said transmitter and arranged to selectively connect to said 90-degree hybrid coupler in said first mode and said second circulator in said second mode.

13. The illumination system of claim 8, wherein said receiver includes a first receiver and a second receiver, and wherein said illumination network further includes a first circulator connected to said first horn and said first receiver, a second circulator connected to said second horn and said second receiver, a power splitter connected to said first circulator, a first switch connected to said transmitter and arranged to selectively connect to said power splitter in said first mode and said second circulator in said second mode and a second switch connected to said second circulator and arranged to selectively connect to said power splitter in said first mode and said transmitter in said second mode.

14. The illumination system of claim 8, wherein said receiver includes a first receiver and a second receiver, wherein said transmitter includes a first transmitter and a second transmitter phase-locked with respect to one another, and wherein said illumination network further includes a first circulator connected to said first horn, said first receiver and said first transmitter and a second circulator connected to said second horn, said second receiver and said second transmitter.

15. The illumination system of claim 8, wherein said illumination network further includes a circulator connected to said transmitter, a variable gain amplifier connected to said circulator, a summation node connected to said variable gain amplifier and said receiver and a 90-degree hybrid coupler connected to said first horn, said second horn, said summation node and said circulator.

16. The illumination system of claim 1, wherein said illumination network includes first illumination optics and second illumination optics, and wherein said transmitter and said receiver form a first transceiver operably connected to said first illumination optics, and further comprising:
 a second transceiver operably connected to said second illumination optics.

17. A microwave imaging system, comprising:
 an antenna array including a plurality of antenna elements, each of said antenna elements being capable of being programmed with a respective direction coefficient to direct microwave illumination to and from a target associated with an object, said antenna array including subarrays of said antenna elements arranged in a sparse geometry to form complementary subarray patterns of said antenna array;
 an illumination system operable to provide microwave illumination to illuminate said complementary patterns of said antenna array and receive reflected microwave illumination reflected by said target from said complementary subarray patterns of said antenna array to produce a first receive signal in a first mode and a second receive signal in a second mode; and
 a processor operable to determine a value associated with the target in a microwave image of the object as a linear combination of said first receive signal and said second receive signal.

18. The system of claim 17, wherein said illumination system is operable to illuminate both said complementary subarray patterns of said antenna array and receive reflected microwave illumination reflected by said target from both said complementary subarray patterns of said antenna array to produce said first receive signal, and wherein said illumination system is further operable to provide said microwave illumination to illuminate a first one of said complementary subarray patterns of said antenna array and receive said reflected microwave illumination from a second one of said complementary subarray patterns of said antenna array to produce said second receive signal.

19. The system of claim 17, wherein each of said antenna elements in said complementary subarray patterns is programmed with a respective first direction coefficient to direct microwave illumination from said target toward said illumination system in said first mode and each of said antenna elements in one of said complementary subarray patterns is programmed with a respective second direction coefficient inverted with respect to said respective first direction coefficient in said second mode.

20. The system of claim 17, wherein said complementary subarray patterns form one of a cross-shaped subarray pattern or a picture frame subarray pattern.

21. The system of claim 17, wherein said processor is further operable to switch between said first mode and said second mode.

22. The system of claim 17, wherein said processor is further operable to substantially simultaneously receive said first receive signal and said second receive signal.

23. The system of claim 22, wherein said illumination system includes a first receiver connected to receive said reflected microwave illumination to produce said second receive signal in said second mode and to produce a first portion of said first receive signal in said first mode, wherein said illumination system further includes a second receiver connected to receive said reflected microwave illumination to produce a second portion of said first receive signal in said first mode, and wherein said processor is further operable to perform digital multiplication and addition of said first portion of said first receive signal, said second portion of said first receive signal and said second receive signal to determine said value.

24. The system of claim 17, wherein said first receive signal and said second receive signal are complex signals describing a main scanning lobe and one or more sidelobes and said processor is further operable to add the product of said first receive signal and a first complex multiplier with the product of said second receive signal and a second complex multiplier to constructively enhance said main scanning lobe and destructively cancel said one or more sidelobes, and wherein said first complex multiplier and said second complex multiplier are selected as a function of said sparse geometry.

25. The system of claim 17, further comprising:
 a display for displaying the microwave image of the object.

26. A method for capturing a microwave image of an object, comprising:
 providing an antenna array including a plurality of antenna elements for directing microwave illumination to and from a target associated with said object, said antenna array including subarrays of said antenna elements arranged in a sparse geometry to form complementary subarray patterns of said antenna array;
 illuminating both said complementary subarray patterns of said antenna array to direct a first transmit beam of said microwave illumination towards said target;
 receiving a first reflect beam of reflected microwave illumination reflected by said target from both said complementary subarray patterns of said antenna array to produce a first receive signal in a first mode;
 illuminating a first one of said complementary subarray patterns of said antenna array to direct a second transmit beam of said microwave illumination towards said target;

receiving a second reflect bean of said reflected microwave illumination from a second one of said complementary subarray patterns of said antenna array to produce a second receive signal in a second mode; and determining an intensity of said reflected microwave illumination reflected from said target as a linear combination of said first receive signal and said second receive signal.

27. The method of claim 26, wherein said receiving said first receive signal and said receiving said second receive signal are performed substantially simultaneously.

28. The method of claim 26, wherein said first receive signal and said second receive signal are complex signals describing a main scanning lobe and one or more sidelobes, and wherein said measuring further comprises:

adding the product of said first receive signal and a first complex multiplier with the product of said second receive signal and a second complex multiplier to constructively enhance said main scanning lobe and destructively cancel said one or more sidelobes.

* * * * *

UNITED STATES PATENT AND TRADEMARK OFFICE
CERTIFICATE OF CORRECTION

PATENT NO. : 7,280,068 B2
APPLICATION NO. : 11/181111
DATED : October 9, 2007
INVENTOR(S) : Lee et al.

Page 1 of 1

It is certified that error appears in the above-identified patent and that said Letters Patent is hereby corrected as shown below:

On the Title page, in field (56), under "Other Publications", in column 2, line 1, delete "undirectional," and insert -- unidirectional --, therefor.

On the Title page, in field (56), under "Other Publications", in column 2, line 2, delete "M.D.Antennas" and insert -- M.D. Antennas --, therefor.

In column 23, line 1, in Claim 26, delete "bean" and insert -- beam --, therefor.

Signed and Sealed this

Twentieth Day of May, 2008

JON W. DUDAS
*Director of the United States Patent and Trademark Office*